United States Patent
Saito

(10) Patent No.: US 10,908,327 B2
(45) Date of Patent: Feb. 2, 2021

(54) OPTICAL REFLECTION FILM AND OPTICAL REFLECTOR

(71) Applicant: Konica Minolta, Inc., Tokyo (JP)

(72) Inventor: Yoichi Saito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 42 days.

(21) Appl. No.: 15/776,608

(22) PCT Filed: Oct. 6, 2016

(86) PCT No.: PCT/JP2016/079742
§ 371 (c)(1),
(2) Date: May 16, 2018

(87) PCT Pub. No.: WO2017/086048
PCT Pub. Date: May 26, 2017

(65) Prior Publication Data
US 2018/0329123 A1   Nov. 15, 2018

(30) Foreign Application Priority Data
Nov. 17, 2015   (JP) ................. 2015-224573

(51) Int. Cl.
*G02B 5/08* (2006.01)
*G02B 5/26* (2006.01)
(Continued)

(52) U.S. Cl.
CPC .............. *G02B 5/0816* (2013.01); *B32B 7/02* (2013.01); *B32B 7/022* (2019.01); *B32B 7/023* (2019.01);
(Continued)

(58) Field of Classification Search
CPC .................. B32B 7/00–7/14; G02B 5/00–5/32
See application file for complete search history.

(56) References Cited

U.S. PATENT DOCUMENTS 2,761,419 A   9/1956   Mercier et al.
2,761,791 A   9/1956   Russell
(Continued)

FOREIGN PATENT DOCUMENTS

CN   103649790 A   3/2014
JP   S493284 A   1/1974
(Continued)

OTHER PUBLICATIONS

Bastida et al. "On the Thickness Dependence of the Modulus of Elasticity of Polymers". Polymer Testing, 17 (1998); pp. 139-145.*
(Continued)

*Primary Examiner* — Prashant J Khatri
(74) *Attorney, Agent, or Firm* — Cantor Colburn LLP

(57) ABSTRACT

An optical reflection film may include an optical interference film formed by alternately laminating a high refractive index layer and a low refractive index layer with a refractive index difference therebetween on a substrate. Among the high refractive index layers and the low refractive index layers constituting the optical interference film, if a layer disposed closest to the substrate is defined as a lowermost layer, a layer farthest from the substrate is defined as an uppermost layer, and each of layers disposed between the lowermost layer and the uppermost layer is defined as an intermediate layer, the average elastic modulus of the intermediate layers measured by a nano-indentation method is higher than the elastic modulus of the uppermost layer by 2 GPa or more, and the film thickness of the uppermost layer is 1.2 to 7 times the average film thickness of the intermediate layers.

14 Claims, 3 Drawing Sheets

(51) Int. Cl.
*B32B 7/02* (2019.01)
*G02B 5/28* (2006.01)
*B32B 7/022* (2019.01)
*B32B 7/023* (2019.01)

(52) U.S. Cl.
CPC ............ *G02B 5/0841* (2013.01); *G02B 5/26* (2013.01); *G02B 5/282* (2013.01)

(56) References Cited

U.S. PATENT DOCUMENTS

| | | | |
|---|---|---|---|
| 4,620,197 | A | 10/1986 | Shigehiko et al. |
| 4,877,447 | A | 10/1989 | Suzuki et al. |
| 5,372,884 | A | 12/1994 | Abe et al. |
| 5,540,978 | A * | 7/1996 | Schrenk ............... B32B 7/02 428/212 |
| 2012/0224265 | A1 * | 9/2012 | Clark ................. G02B 5/26 359/584 |
| 2014/0002895 | A1 * | 1/2014 | Nakajima ............ G02B 5/282 359/359 |
| 2014/0009244 | A1 | 1/2014 | Pavageau |
| 2014/0313573 | A1 * | 10/2014 | Nakajima ............ G02B 5/287 359/359 |
| 2015/0153423 | A1 | 6/2015 | Fink |
| 2015/0219810 | A1 * | 8/2015 | Taka .................... G02B 5/0841 359/584 |

FOREIGN PATENT DOCUMENTS

| | | | |
|---|---|---|---|
| JP | S5714091 | A | 1/1982 |
| JP | S5774192 | A | 5/1982 |
| JP | S5787989 | A | 6/1982 |
| JP | S5942993 | A | 3/1984 |
| JP | S5952689 | A | 3/1984 |
| JP | S60219084 | A | 11/1985 |
| JP | S6120792 | A | 1/1986 |
| JP | S6183134 | A | 4/1986 |
| JP | S61146591 | A | 7/1986 |
| JP | S61188183 | A | 8/1986 |
| JP | S61242871 | A | 10/1986 |
| JP | S6297830 | A | 5/1987 |
| JP | 62261476 | A | 11/1987 |
| JP | S62280069 | A | 12/1987 |
| JP | S6317807 | A | 1/1988 |
| JP | S63307979 | A | 12/1988 |
| JP | H0195091 | A | 4/1989 |
| JP | H01206088 | A | 8/1989 |
| JP | H0278324 | A | 3/1990 |
| JP | H0313376 | A | 1/1991 |
| JP | H062261 | A | 1/1994 |
| JP | H0692011 | A | 4/1994 |
| JP | H079758 | A | 1/1995 |
| JP | H0781214 | A | 3/1995 |
| JP | H07101142 | A | 4/1995 |
| JP | H07137431 | A | 5/1995 |
| JP | H07179029 | A | 7/1995 |
| JP | H07285265 | A | 10/1995 |
| JP | H0825795 | A | 1/1996 |
| JP | 2000053421 | A | 2/2000 |
| JP | 2000063119 | A | 2/2000 |
| JP | 2000204301 | A | 7/2000 |
| JP | 2004170672 | A | 6/2004 |
| JP | 4219266 | 32 | 2/2009 |
| JP | 4550753 | B2 | 9/2010 |
| JP | 5774193 | B2 | 9/2015 |
| JP | 6110483 | A | 10/2015 |
| JP | 6072785 | 32 | 2/2017 |
| WO | 9426530 | A1 | 11/1994 |
| WO | 2007043300 | A1 | 4/2007 |
| WO | 2013054912 | A1 | 4/2013 |
| WO | 2013058141 | A1 | 4/2013 |
| WO | WO-2014024873 | A1 * | 2/2014 |

OTHER PUBLICATIONS

International Search Report corresponding to Application No. PCT/JP2016/079742; dated Dec. 27, 2016.
SIPO First Office Action corresponding to Application No. 201680065958.6; dated Dec. 11, 2019.
CNIPA The Second Office Action for Corresponding CN Patent Application No. 201680065958.6 dated May 9, 2020.

* cited by examiner

FIG. 3

| Sample | Uppermost layer A (low refractive index layer 5L) | | | Intermediate layer B | | Lowermost layer C (low refractive index layer 5L) | | | Film thickness ratio (tb = 140 nm) | | Elastic modulus | | |
|---|---|---|---|---|---|---|---|---|---|---|---|---|---|
| | Particle ratio (vol%) | Emulsion resin Average particle diameter | Emulsion resin Ratio (wt%) | High refractive index layer 5H Particle ratio (vol%) | Low refractive index layer 5L Particle ratio (vol%) | Particle ratio (vol%) | Emulsion resin Average particle diameter | Emulsion resin Ratio (wt%) | [ta/tb] | [tc/tb] | Uppermost layer A [Ea] (GPa) | Intermediate layer B [Eb] (GPa) | Lowermost layer C [Ec] (GPa) |
| Example 1 | 15 | - | - | - | - | - | - | - | - | - | 7 | - | - |
| Example 2 | 26 | - | - | - | - | - | - | - | - | - | 11 | - | - |
| Example 3 | 30 | - | - | - | - | - | - | - | - | - | 13 | - | - |
| Example 4 | 35 | - | - | - | - | - | - | - | - | - | 14 | - | - |
| Example 5 | 40 | - | - | - | - | - | - | - | - | - | 16 | - | - |
| Example 6 | 35 | - | - | 45 | 50 | 52 | - | - | 2 | 2 | 14 | 20 | 20 |
| Example 7 | 35 | - | - | 45 | 50 | 52 | - | - | 2 | 1 | 14 | 20 | 20 |
| Example 8 | 35 | - | - | 45 | 50 | 52 | - | - | 1.2 | 2 | 14 | 20 | 20 |
| Example 9 | 35 | - | - | 45 | 50 | 52 | - | - | 3 | 2 | 14 | 20 | 20 |
| Example 10 | 35 | - | - | 45 | 50 | 52 | - | - | 5 | 2 | 14 | 20 | 20 |
| Example 11 | 35 | - | - | 45 | 50 | 41 | - | - | 7 | 2 | 16 | 20 | 16 |
| Example 12 | 35 | - | - | 45 | 50 | 37 | - | - | 2 | 3 | 14 | 20 | 14 |
| Example 13 | 35 | - | - | 45 | 50 | 35 | - | - | 2 | 5 | 12 | 20 | 12 |
| Example 14 | 35 | - | - | 45 | 50 | 41 | - | - | 2 | 7 | 16 | 20 | 16 |
| Example 15 | 35 | - | - | 45 | 50 | 37 | - | - | 2 | 4 | 14 | 20 | 14 |
| Example 16 | 35 | - | - | 45 | 50 | 37 | - | - | 3 | 4 | 14 | 20 | 14 |
| Example 17 | 35 | - | - | 45 | 50 | 37 | - | - | 3 | 4 | 14 | 20 | 13 |
| Example 18 | 35 | - | - | 45 | 50 | 37 | - | - | 3 | 4 | 13 | 20 | 13 |
| Example 19 | 35 | 55 | 15 | 45 | 50 | 37 | 55 | 15 | 3 | 4 | 12 | 20 | 13 |
| Example 20 | 35 | 80 | 15 | 45 | 50 | 37 | 80 | 15 | 3 | 4 | 11 | 20 | 13 |
| Example 21 | 35 | 100 | 15 | 45 | 50 | 37 | 100 | 15 | 1 | 4 | 12 | 20 | 13 |
| Example 22 | 35 | - | - | 45 | 50 | 40 | - | - | 0.8 | 1 | 14 | 20 | 21 |
| Example 23 | 35 | - | - | 45 | 50 | 55 | 55 | 15 | 1 | 2 | 12 | 20 | 12 |
| Comparative Example 1 | 55 | - | - | - | - | - | - | - | - | - | 20 | - | - |
| Comparative Example 2 | 42 | - | - | - | - | - | - | - | - | - | - | - | - |
| Comparative Example 3 | 35 | - | - | - | - | 35 | - | - | 10 | 2 | - | - | - |
| Comparative Example 4 | - | - | - | - | - | - | - | - | - | - | - | - | - |
| Comparative Example 5 | - | - | - | - | - | - | - | - | - | - | - | - | - |

FIG. 4

| Sample | Uppermost layer A (low refractive index layer 5L) | | | Lowermost layer C (low refractive index layer 5L) | | | Film thickness ratio (th = 140 nm) | | | Elastic modulus | | | Elastic modulus difference | | | Before weather resistance test | | After weather resistance test (rainfall xenon 500 hr) | |
|---|---|---|---|---|---|---|---|---|---|---|---|---|---|---|---|---|---|---|---|
| | Particle ratio (vol%) | Emulsion resin (6) Avg. particle diameter (6d) nm ≥ | (5) Ratio (wt%) | Particle ratio (vol%) | Emulsion resin (6') Avg. particle diameter (6d) nm ≥ | (5') Ratio (wt%) | (1) [ta/tb] (1.2-7) | (4) [tc/tb] (1.2-7) | (3) Uppermost layer A [Ea] (8-15 Gpa) | Intermediate layer B [Eb] (Gpa) | Lowermost layer C [Ec] (Gpa) | (1') [Eb-Ea] (≥2 GPa) | (2) [Ec-Ea] (>0 GPa) | (2') [Eb-Ec] (≥2 GPa) | Rainbow unevenness | Haze % | Haze (difference) % | Cracking |
| Example 1 | 15 | - | - | | | | | | 7 | 20 | 20 | 13 | 13 | 0 | C | 2.5 | 3.6 (1.1) | C |
| Example 2 | 26 | - | - | | | | | | 11 | | | 9 | 9 | 0 | C | 2.4 | 3.0 (0.6) | A |
| Example 3 | 30 | - | - | 52 | - | - | 2 | 2 | 13 | | | 7 | 7 | 0 | A | 1.9 | 2.3 (0.4) | B |
| Example 4 | 35 | - | - | | | | | | 14 | | | 6 | 6 | 0 | A | 1.7 | 2.5 (0.8) | B |
| Example 5 | 40 | - | - | | | | | | 16 | | | 4 | 4 | 0 | A | 1.7 | 2.8 (0.9) | C |
| Example 6 | 35 | - | - | 52 | - | - | 2 | 1 | 14 | 20 | 20 | 6 | 6 | 0 | A | 1.7 | 2.5 (0.8) | C |
| Example 7 | 35 | - | - | | | | 1.2 | | | | | | | | A | 1.8 | 2.7 (0.9) | C |
| Example 8 | 35 | - | - | 52 | - | - | 3 | 2 | 14 | 20 | 20 | 6 | 6 | 0 | A | 1.8 | 2.4 (0.6) | B |
| Example 9 | 35 | - | - | | | | 5 | | | | | | | | A | 1.9 | 2.2 (0.3) | A |
| Example 10 | 35 | - | - | | | | 7 | | | | | | | | B | 2.0 | 2.9 (0.9) | B |
| Example 11 | 35 | - | - | 41 | - | - | | | | | 16 | 6 | 2 | 4 | B | 2.2 | 2.9 (0.7) | C |
| Example 12 | 35 | - | - | 37 | - | - | 2 | 2 | 14 | 20 | 14 | 6 | 0 | 6 | B | 1.8 | 2.6 (0.8) | B |
| Example 13 | 35 | - | - | 35 | - | - | | | | | 12 | 6 | -2 | 8 | C | 1.6 | 2.5 (0.9) | C |
| Example 14 | 35 | - | - | 41 | - | - | 2 | 3 | 14 | 20 | 16 | 6 | 2 | 4 | A | 2.1 | 2.8 (0.7) | C |
| Example 15 | 35 | - | - | 37 | - | - | | 5 | | | | | | | A | 2.1 | 2.6 (0.5) | B |
| Example 16 | 35 | - | - | 37 | - | - | | 7 | | | | | | | B | 2.4 | 3.2 (0.8) | B |
| Example 17 | 35 | - | - | 37 | - | - | 3 | 4 | 14 | 20 | 14 | 6 | 0 | 6 | B | 1.8 | 2.3 (0.5) | B |
| Example 18 | 35 | - | - | | | | | | 13 | | | 7 | 1 | 6 | B | 1.7 | 2.1 (0.4) | B |
| Example 19 | 35 | 55 | 7 | | | | | | 12 | | | 8 | 2 | 6 | A | 2.0 | 2.0 (0.3) | A |
| Example 20 | 35 | 55 | 15 | 37 | - | - | 3 | 4 | 10 | 20 | 14 | 10 | 4 | 6 | A | 2.2 | 2.4 (0.2) | A |
| Example 21 | 35 | 80 | 45 | 37 | - | - | | | 12 | | | 8 | 1 | 7 | A | 1.5 | 1.7 (0.2) | A |
| Example 22 | 35 | 80 | 15 | 37 | 55 | 15 | 3 | 4 | 12 | 20 | 13 | 9 | 2 | 7 | B | 1.6 | 2.4 (0.8) | A |
| Example 23 | 35 | 100 | 15 | 37 | 80 | 15 | | | 11 | | 13 | 9 | 2 | 7 | B | 2.1 | 2.9 (0.7) | A |
| | | | | | 100 | | | | | | | | | | | | | |
| Comparative Ex. 1 | 55 | - | - | 40 | - | - | 1 | 4 | 20 | 20 | 13 | 0 | -7 | 7 | B | 1.3 | 4.1 (2.8) | D |
| Comparative Ex. 2 | | | | | 55 | 15 | 0.8 | 1 | | | | | | | B | 1.4 | 2.8 (1.4) | C |
| Comparative Ex. 3 | 42 | - | - | 55 | - | - | 1 | 2 | 14 | 20 | 21 | 6 | 7 | -1 | B | 1.5 | 3.5 (2.0) | E (NG) |
| Comparative Ex. 4 | | | | | | | 10 | | | | | | | | B | 1.6 | 3.2 (1.6) | E (NG) |
| Comparative Ex. 5 | 35 | - | - | 35 | - | - | | | 12 | | 12 | 8 | 0 | 8 | D (NG) | 4.1 | 5.2 (1.1) | D |

OPTICAL REFLECTION FILM AND OPTICAL REFLECTOR

CROSS REFERENCE TO RELATED APPLICATIONS

This is a U.S. national stage of application No. PCT/JP2016/079742, filed on Oct. 6, 2016. Priority under 35 U.S.C. § 119(a) and 35 U.S.C. § 365(b) is claimed from Japanese Patent Application No. 2015-224573 filed on Nov. 17, 2015, the disclosure of which is also incorporated herein by reference.

TECHNICAL FIELD

The present invention relates to an optical reflection film and an optical reflector.

BACKGROUND ART

In recent years, in order to reduce a burden on a cooling device, there has been a growing demand for an infrared shielding film attached to a window glass of a building or a vehicle for blocking transmission of heat rays of sunlight. As one configuration for shielding infrared rays, an optical reflection film including an optical interference film obtained by alternately laminating a high refractive index layer and a low refractive index layer on a substrate is known.

As such an optical reflection film, a configuration in which a high refractive index layer and a low refractive index layer are formed on a substrate by applying a wet application method using an aqueous application liquid containing a water-soluble polymer and metal oxide particles is known (see the following Patent Literature 1).

In such an optical reflection film, in order to prevent occurrence of curling due to thinning of a film, a configuration in which a lowermost layer of an optical interference film disposed in contact with a substrate contains metal oxide particles and an emulsion resin, and the thickness of the lowermost layer is 1.2 to 8 times the average thickness of layers other than the lowermost layer has been disclosed (see the following Patent Literature 2).

CITATION LIST

Patent Literature

Patent Literature 1: WO 2013/054912 A
Patent Literature 2: WO 2013/058141 A

SUMMARY OF INVENTION

Technical Problem

However, in an infrared shielding film having such a configuration as described above, there is a problem in weather resistance that an optical interference film is cracked by repetition of expansion and shrinkage due to inclusion of moisture or heat in long-term use or peeled thereby.

Therefore, an object of the present invention is to provide an optical reflection film and an optical reflector having excellent weather resistance by preventing occurrence of cracking or peeling in an optical interference film in long-term use.

Solution to Problem

In order to achieve the above object, the present invention provides an optical reflection film including an optical interference film formed by alternately laminating a high refractive index layer and a low refractive index layer with a refractive index difference therebetween on a substrate, in which, among the high refractive index layers and the low refractive index layers constituting the optical interference film, if a layer disposed closest to the substrate is defined as a lowermost layer, a layer farthest from the substrate is defined as an uppermost layer, and each of layers disposed between the lowermost layer and the uppermost layer is defined as an intermediate layer, the average elastic modulus of the intermediate layers measured by a nano-indentation method is higher than the elastic modulus of the uppermost layer by 2 GPa or more, and the film thickness of the uppermost layer is 1.2 to 7 times the average film thickness of the intermediate layers. In addition, the present invention provides an optical reflector having such an optical reflection film disposed on at least one surface of a base.

Advantageous Effects of Invention

The present invention having such a configuration as described above can provide an optical reflection film and an optical reflector capable of preventing occurrence of cracking or peeling of an optical interference film in long-term use and improving weather resistance, as described in the following Examples.

BRIEF DESCRIPTION OF DRAWINGS

FIG. 3 is a first table showing an experimental result of examples and comparative examples according to an intermediate layer.

FIG. 4 is a second table showing an evaluation result of examples and comparative examples according to a weather resistance test.

DESCRIPTION OF EMBODIMENTS

<<Optical Reflection Film>>

Figure 1:
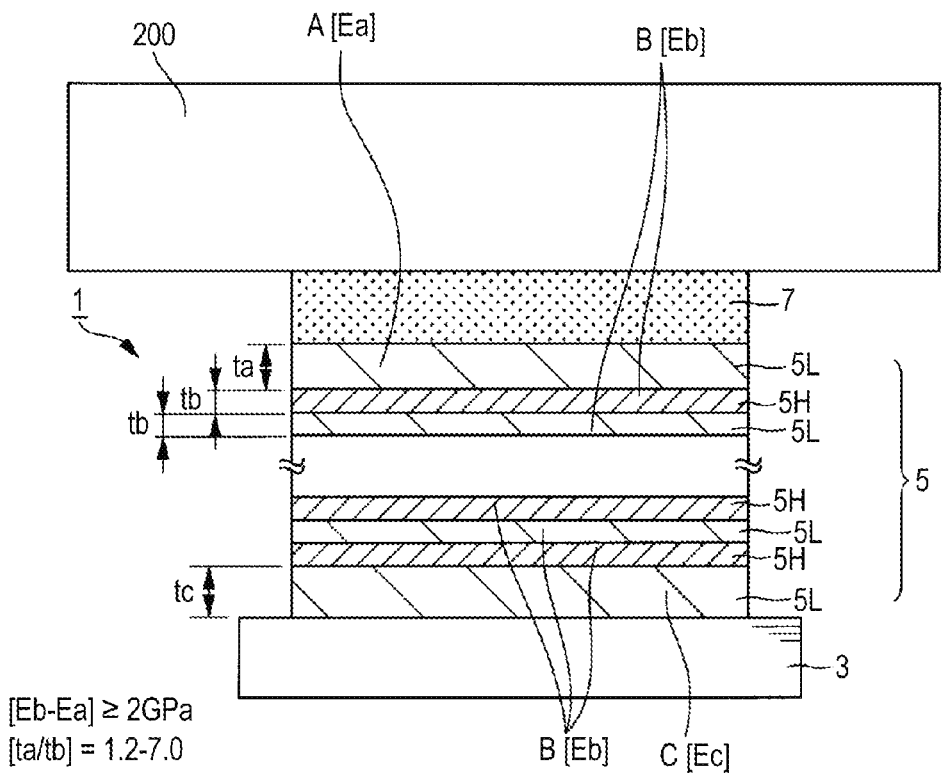
FIG. 1 is a schematic cross-sectional view for explaining a configuration of an optical reflection film of an embodiment.

Hereinafter, an embodiment of the present invention will be described in detail with reference to the drawings. FIG. 1 is a schematic cross-sectional view for explaining a configuration of an optical reflection film of an embodiment.

As illustrated in FIG. 1, an optical reflection film 1 of the embodiment is attached to a device 200 exposed to sunlight for a long time, such as an outdoor window of a building or an automobile window, to be used. The optical reflection film 1 includes an optical interference film 5 formed by alternately laminating a high refractive index layer 5H and a low refractive index layer 5L with a refractive index difference therebetween on one main surface of a substrate 3. The optical reflection film 1 may include a pressure-sensitive adhesive layer 7 above the optical interference film 5, for example, and is bonded to the device 200 via the pressure-sensitive adhesive layer 7 to be used.

In the drawings, the configuration of the optical reflection film 1 having the optical interference film 5 disposed only on one main surface of the substrate 3 is illustrated. However, the optical reflection film 1 may have the optical interference films 5 disposed on both surfaces of the substrate 3.

As optical characteristics of the optical reflection film 1, a transmittance in a visible light region specified in JIS R3106-1998 is 50% or more, preferably 75% or more, and more preferably 85% or more. If the optical reflection film 1 is, for example, a near-infrared shielding film, a region having a reflectance of more than 50% is preferably present in a wavelength region of 900 nm to 1400 nm. Incidentally, in the following description, the embodiment will be described assuming that the reflection film 1 is a near-infrared shielding film. However, the reflection film 1 is not limited to a near-infrared shielding film but may be a film for reflecting and shielding infrared rays or ultraviolet rays. It is assumed that the film thickness and constituent materials of each layer are set such that a reflectance in each wavelength region exceeds 50%.

The total thickness of the optical reflection film 1 is preferably 12 µm to 315 µm, more preferably 15 µm to 200 µm, and still more preferably 20 µM to 100 µm.

Next, a detailed configuration of the optical reflection film 1 will be described in order of the optical interference film 5 and the substrate 3.

<Optical Interference Film 5>

In the optical interference film 5, the range of the laminating number of the high refractive index layer 5H and the low refractive index layer 5L per surface of the substrate 3 is preferably 100 layers or less and 9 layers or more, more preferably 45 layers or less and 15 layers or more, and still more preferably 45 layers or less and 21 layers or more from a viewpoint of productivity. Note that the above preferable range of the total number of the high refractive index layer 5H and low refractive index layer 5L can be applied also to a case where lamination is performed only on one surface of the substrate 3 and also to a case where lamination is simultaneously performed on both surfaces of the substrate 3. In a case where lamination is performed on both surfaces of the substrate 3, the total number of the high refractive index layer 5H and the low refractive index layer 5L on one surface of the substrate 3 may be the same as or different from that of the other surface.

Here, among the plurality of high refractive index layers 5H and low refractive index layer 5L in the optical interference film 5, a layer farthest from the substrate 3 is referred to as an uppermost layer A. A layer closest to the substrate 3 is referred to as a lowermost layer C. Each of layers laminated between the uppermost layer A and the lowermost layer C is referred to as an intermediate layer B.

In this case, each of the uppermost layer A and the lowermost layer C may be either the high refractive index layer 5H or the low refractive index layer 5L. However, each of the lowermost layer C and the uppermost layer A of the optical reflection film 1 is preferably formed of the low refractive index layer 5L as illustrated in the drawing from viewpoints of excellent adhesiveness of the lowermost layer C to the substrate 3, excellent biased liquid resistance due to drying air when the uppermost layer A is applied to form a film, and excellent applicability and adhesiveness of a pressure-sensitive adhesive layer, a hard coat layer, or the like to the uppermost layer A.

Next, an elastic modulus, a film thickness ratio, other characteristics, and optical characteristics such as a refractive index and a reflectance of the optical interference film 5 as described above will be sequentially described, and then structures and constituent materials of the high refractive index layer 5H and the low refractive index layer 5L will be described.

[Elastic Modulus of Optical Interference Film 5]

In the optical interference film 5, the elastic moduli of the uppermost layer A, the intermediate layers B, and the lowermost layer C have a specific relationship. That is, an average elastic modulus [Eb] of the intermediate layers B is larger than an elastic modulus [Ea] of the uppermost layer A by 2 GPa or more, and [Eb−Ea]≥2 GPa is satisfied. As a more preferable relationship, the average elastic modulus [Eb] of the intermediate layers B is larger than an elastic modulus [Ec] of the lowermost layer C by 2 GPa or more, and [Eb−Ec]≥2 GPa is satisfied. Furthermore, the elastic modulus [Ec] of the lowermost layer C is larger than the elastic modulus [Ea] of the uppermost layer A, and [Ec]>[Ea] and [Ec−Ea]>0 are satisfied. The elastic modulus [Ea] of the uppermost layer A is preferably 8 GPa or more and 15 GPa or less.

Here, the elastic modulus is an elastic modulus measured by a nano-indentation method and is assumed to be a value measured for a monolayer film formed on a hard substrate. The average elastic modulus [Eb] of the intermediate layers B is an average value of the elastic moduli of the high refractive index layer 5H and the low refractive index layer 5L constituting the intermediate layers B.

The elastic modulus of each of the uppermost layer A, the intermediate layers B, and the lowermost layer C in the optical interference film 5 can be adjusted by a material constituting each of the layers. As described in detail later, each of the uppermost layer A, the intermediate layers B, and the lowermost layer C contains a water-soluble polymer, inorganic oxide particles, an emulsion resin, and the like. By adjusting the content of at least one of the inorganic oxide particles and the emulsion resin with respect to the content of the water-soluble polymer, the elastic moduli of the uppermost layer A, the intermediate layers B, and the lowermost layer C are adjusted.

[Film Thickness Ratio of Optical Interference Film 5]

In the optical interference film 5, the film thicknesses of the uppermost layer A, the intermediate layers B, and the lowermost layer C have a specific relationship. That is, a film thickness [ta] of the uppermost layer A is 1.2 to 7 times an average film thickness [tb] of the intermediate layers B, and [ta/tb]=1.2 to 7 is satisfied. More preferably, a film thickness [tc] of the lowermost layer C is 1.2 to 7 times the average film thickness [tb] of the intermediate layers B, and [tc/tb]=1.2 to 7 is satisfied.

Here, the average film thickness [tb] of the intermediate layers B is an average value of film thicknesses of the high refractive index layer 5H and the low refractive index layer 5L constituting the intermediate layers B.

[Other Characteristics of Optical Interference Film 5]

As described in detail later, each of the high refractive index layer 5H and the low refractive index layer 5L constituting the optical interference film 5 contains a water-soluble polymer and inorganic oxide particles as essential components. Among these layers, at least one of the lowermost layer C and the uppermost layer A preferably contains an emulsion resin, and particularly preferably, the uppermost layer A contains an emulsion resin. The emulsion resin used here preferably has an average particle diameter of 60 nm or less. Details of the emulsion resin will be described below.

[Optical Characteristics of Optical Interference Film 5]

The optical reflection film 1 is preferably designed so as to have a large refractive index difference between the high refractive index layer 5H and the low refractive index layer 5L from a viewpoint that a near infrared reflectance can be increased with a small number of layers. From such a viewpoint, the refractive index difference between the high refractive index layer 5H and the low refractive index layer 5L adjacent to each other in the optical interference film 5 is preferably 0.1 or more, more preferably 0.25 or more, still more preferably 0.3 or more, further still more preferably 0.35 or more, and most preferably 0.4 or more.

The refractive index difference and the required number of layers can be calculated using a commercially available optical design software. For example, in order to obtain a near infrared reflectance of 90% or more, if the refractive index difference is smaller than 0.1, it is necessary to laminate 200 layers or more. This not only reduces productivity but also increases scattering at a lamination interface to reduce transparency. Therefore, manufacturing without trouble may be very difficult.

In a case where the optical interference film 5 is formed by alternately laminating the high refractive index layer 5H and the low refractive index layer 5L as described above, the refractive index difference between the high refractive index layer 5H and the low refractive index layer 5L is preferably in the above preferable range of the refractive index difference. However, for example, in a case where the uppermost layer A is formed as a layer for protecting a film or in a case where the lowermost layer C is formed as an adhesiveness improving layer with the substrate 3, each of the uppermost layer A and the lowermost layer C may have a configuration outside the above preferable range of the refractive index difference.

<High Refractive Index Layer 5H>

The high refractive index layer 5H contains a first water-soluble polymer and first inorganic oxide particles as essential components and may further contain at least one selected from the group consisting of a curing agent, a surfactant, an emulsion resin, and various additives as necessary.

Particularly, in a case where the high refractive index layer 5H constitutes either of the lowermost layer C and the uppermost layer A of the optical interference film 5, the high refractive index layer 5H preferably contains an emulsion resin. Particularly, the high refractive index layer 5H constituting the uppermost layer A preferably contains an emulsion resin.

The high refractive index layer 5H as described above has a refractive index preferably of 1.80 to 2.50, more preferably of 1.90 to 2.20.

Each of the high refractive index layers 5H has a thickness preferably of 20 to 800 nm, more preferably of 50 to 350 nm. However, the film thickness of each of the high refractive index layers 5H is set such that the film thicknesses of the uppermost layer A, the intermediate layers B, and the lowermost layer C satisfy the above relationship.

Here, in the high refractive index layer 5H and the low refractive index layer 5L adjacent to each other, there may be a definite interface therebetween, or an interface therebetween may gradually change. In a case where the interface gradually changes, if [maximum refractive index−minimum refractive index=Δn] is defined in a region where the respective layers are mixed with each other and the refractive index changes continuously, a site satisfying [minimum refractive index+Δn/2] between two layers is regarded as a layer interface, and the thickness of each of the high refractive index layers 5H is measured. This also applies to measurement of the thickness of the low refractive index layer 5L described later.

An inorganic oxide concentration profile of a laminated film as the optical interference film 5 formed by alternately laminating the high refractive index layer 5H and the low refractive index layer 5L can be viewed by performing etching in a depth direction from a surface by a sputtering method, performing sputtering at a rate of 0.5 nm/min by assuming an outermost surface to be 0 nm using an XPS surface analyzer, and measuring an atomic composition ratio. In addition, the inorganic oxide concentration profile can be also viewed by cutting a laminated film and measuring an atomic composition ratio on the cut surface with an XPS surface analyzer. In a case where the concentration of the inorganic oxide changes discontinuously in a mixed region, a boundary can be found by tomography with a transmission electron microscope (TEM).

The XPS surface analyzer is not particularly limited, and any type of machine can be used, but ESCALAB-200R manufactured by VG Scientific Corporation is used. Mg is used for an X-ray anode, and measurement is performed with an output of 600 W (acceleration voltage 15 kV, emission current 40 mA).

[First Inorganic Oxide Particles]

Next, each component constituting the high refractive index layer 5H will be described in detail.

The first inorganic oxide particles contained in the high refractive index layer 5H are preferably inorganic oxide particles having a refractive index of 2.0 or more. Specific examples of a material thereof include a metal oxide such as zirconium oxide ($ZrO_2$), zinc oxide (ZnO), or titanium oxide ($TiO_2$). Among these materials, titanium oxide ($TiO_2$) is preferably used from a viewpoint of stability of an application liquid for forming the high refractive index layer 5H. Among materials of $TiO_2$, it is preferable to use rutile type titanium oxide having a particularly high refractive index and low catalytic activity. Incidentally, if catalytic activity is low, a side reaction (photocatalytic reaction) occurring in the high refractive index layer 5H or an adjacent layer is suppressed, and weather resistance can be enhanced.

The first inorganic oxide particles may be particles in which titanium oxide particles are coated with silicon-containing hydrated oxide (hereinafter, referred to as coated particles). Here, the titanium oxide particles mean titanium dioxide ($TiO_2$) particles.

Here, "coated" means a state in which silicon-containing hydrated oxide is attached to at least a part of a surface of titanium oxide particles. That is, a surface of titanium oxide particles used as the first inorganic oxide particles may be completely coated with silicon-containing hydrated oxide, or a part of the surface of the titanium oxide particles may be coated with silicon-containing hydrated oxide. A part of the surface of the titanium oxide particles is preferably coated with silicon-containing hydrated oxide from a viewpoint that the refractive index of the coated titanium oxide particles is controlled by the coating amount of silicon-containing hydrated oxide.

The first inorganic oxide particles may be rutile type titanium oxide particles coated with silicon-containing hydrated oxide, anatase type titanium oxide particles coated with silicon-containing hydrated oxide, or a mixture of these particles. Among these particles, the rutile type titanium oxide particles coated with silicon-containing hydrated oxide is more preferable.

This is because weather resistance of the high refractive index layer 5H and the adjacent low refractive index layer 5L is increased and a refractive index is further increased due to lower photocatalytic activity of the rutile type titanium oxide particles than that of the anatase type titanium oxide particles.

As an aqueous solution containing titanium oxide particles used for manufacturing the first inorganic oxide particles, it is possible to use an aqueous solution having a pH of 1.0 to 3.0, obtained by hydrophobizing a surface of an aqueous titanium oxide sol having a positive zeta potential of titanium particles into a state capable of being dispersed in an organic solvent.

—Content (First Inorganic Oxide Particles)—

The content of the first inorganic oxide particles in the high refractive index layer 5H is preferably 15 to 95% by mass, more preferably 20 to 88% by mass, and still more preferably 30 to 85% by mass with respect to 100% by mass of the solid content of the high refractive index layer 5H.

A case where the content of the first inorganic oxide particles is 15 to 95% by mass with respect to 100% by mass of the solid content of the high refractive index layer 5H is preferable from a viewpoint that a refractive index difference from the low refractive index layer 5L can be increased.

—Particle Diameter (First Inorganic Oxide Particles)—

An average particle diameter (primary average particle diameter) of the first inorganic oxide particles is preferably 2 to 100 nm, more preferably 3 to 50 nm, and still more preferably 4 to 30 nm. The average particle diameter (primary average particle diameter) of the first inorganic oxide particles can be determined by observing particles themselves or particles appearing on a cross section or a surface of a refractive index layer with an electron microscope, measuring particle diameters of any 1,000 particles, and calculating a simple average value (number average) thereof. Here, the particle diameter of an individual particle is represented by a diameter obtained by assuming that the particle has a circular shape equal to a projected area thereof.

In a case where the first inorganic oxide particles are coated particles obtained by coating titanium oxide particles with silicon-containing hydrated oxide, the volume average particle diameter of titanium oxide particles not coated with silicon-containing hydrated oxide is preferably 30 nm or less, more preferably 1 to 30 nm, still more preferably 5 to 15 nm, and most preferably 6 to 10 nm. A case where the volume average particle diameter is 1 nm or more and 30 nm or less is preferable from a viewpoint of less haze and excellent visible light transmission.

Note that the volume average particle diameter of the titanium oxide particles used for the coated particles is an average particle diameter determined by measuring particle diameters of any 1,000 particles by a method for observing the particles themselves by a laser diffraction scattering method or a dynamic light scattering method or using an electron microscope, or a method for observing a particle image appearing on a cross section or a surface of a refractive index layer using an electron microscope, and weighing the particle diameters by a volume represented by a volume average particle diameter $mv=\{\Sigma(vi \cdot di)\}/\{\Sigma(vi)\}$ if the volume per particle is represented by vi in a group of inorganic oxide particles including n1, n2, . . . ni, . . . nk particles having particle diameters of d1, d2, . . . di, . . . dk, respectively.

Furthermore, the titanium oxide particles in the coated particles are preferably monodispersed. The term "monodispersed" as used herein means that the monodispersion degree determined by the following formula is 40% or less. The monodispersion degree is more preferably 30% or less, and particularly preferably 0.1 to 20%.

Monodispersion degree=[(standard deviation determined from distribution of volume particle diameter)/(volume average particle diameter)]×100

Here, interlayer mixing between the high refractive index layer 5H and the low refractive index layer 5L is suppressed by an interaction between the silicon-containing hydrated oxide and the first water-soluble polymer due to inclusion of the coated particles in the high refractive index layer 5H. In addition, it is possible to prevent a problem such as degradation or chalking of a water-soluble polymer due to a photocatalytic activity of titanium oxide in a case where not only rutile type titanium oxide particles but also anatase type titanium oxide particles are used.

The volume average particle diameter of the coated particles is preferably 2 to 31 nm, more preferably 6 to 16 nm, and still more preferably 7 to 11 nm. A case where the volume average particle diameter of the first inorganic oxide particles is 2 to 31 nm is preferable from a viewpoint of optical characteristics such as a near infrared shielding property, transparency, and haze.

Furthermore, the average particle diameter (primary average particle diameter) of the titanium oxide particles in the coated particles is preferably 30 nm or less, more preferably 1 to 30 nm, still more preferably 1 to 20 nm, and most preferably 1 to 10 nm. A case where the primary average particle diameter is 1 nm or more and 30 nm or less is preferable from a viewpoint of less haze and excellent visible light transmission.

The average particle diameter (primary average particle diameter) of the coated particles is preferably 2 to 31 nm, more preferably 2 to 21 nm, and still more preferably 2 to 11 nm. A case where the primary average particle diameter of the coated particles is 2 to 31 nm is preferable from a viewpoint of optical characteristics such as a near infrared shielding property, transparency, and haze.

—Method for Manufacturing First Inorganic Oxide Particles—

As a method for manufacturing the first inorganic oxide particles, a known method can be adopted, and examples thereof include the following methods (i) to (v).

(i) An aqueous solution containing titanium oxide particles is heated and hydrolyzed, or an alkali is added to the aqueous solution containing titanium oxide particles, and the resulting solution is neutralized to obtain titanium oxide having an average particle diameter of 1 to 30 nm. Thereafter, a slurry obtained by mixing the titanium oxide particles and mineral acid such that a molar ratio of titanium oxide particles/mineral acid is in a range of 1/0.5 to 1/2 is heated at a temperature of 50° C. or higher and the boiling point of the slurry or lower. Thereafter, a compound of silicon (for example, a sodium silicate aqueous solution) is added to the obtained slurry containing the titanium oxide particles to precipitate a hydrous oxide of silicon on a surface of the titanium oxide particles, and a surface treatment is performed. Subsequently, impurities are removed from the slurry of the surface-treated titanium oxide particles thus obtained (method described in JP 10-158015 A).

(ii) A titanium oxide sol stable at a pH of an acidic range, obtained by deflocculating titanium oxide such as hydrous titanium oxide with a monobasic acid or a salt thereof is mixed with an alkyl silicate as a dispersion stabilizer by a conventional method to be neutralized (method described in JP 2000-053421 A).

(iii) Hydrogen peroxide and metallic tin are simultaneously or alternately added to an aqueous solution of a mixture such as a titanium salt (for example, titanium tetrachloride) while a molar ratio of $H_2O_2/Sn$ is maintained at 2 to 3 to generate a titanium-containing basic salt aqueous solution. The basic salt aqueous solution thus generated is maintained at a temperature of 50 to 100° C. for 0.1 to 100 hours to generate an aggregate of a titanium oxide-containing composite colloid. Subsequently, an electrolyte in the aggregate slurry is removed, and a stable aqueous sol of titanium oxide-containing composite colloidal particles is manufactured. Meanwhile, by preparing an aqueous solution containing a silicate (for example, a sodium silicate aqueous solution) or the like and removing a cation present in the aqueous solution, a stable aqueous sol of silicon dioxide-containing composite colloidal particles is manufactured. 100 parts by mass of the resulting titanium oxide-containing composite aqueous sol in terms of metal oxide $TiO_2$ and 2 to 100 parts by mass of the silicon dioxide-containing composite aqueous sol in terms of metal oxide $SiO_2$ are mixed, an anion is removed, and then the resulting product is heated and aged at 80° C. for one hour (method described in JP 2000-063119 A).

(iv) Hydrogen peroxide is added to a gel or a sol of hydrous titanic acid to dissolve hydrous titanic acid, and a silicon compound or the like is added to the resulting peroxotitanic acid aqueous solution and heated to obtain a dispersion of core particles formed of a complex solid solution oxide having a rutile type structure. Subsequently, a silicon compound or the like is added to the dispersion of the core particles. Thereafter, the resulting solution is heated to form a coating layer on a surface of the core particles to obtain a sol in which the composite oxide particles are dispersed, and the sol is further heated (method described in JP 2000-204301 A).

(v) A compound selected from an organoalkoxysilane (R1nSiX4-n), hydrogen peroxide, and an aliphatic or aromatic hydroxycarboxylic acid as a stabilizer is added to the hydrosol of titanium oxide obtained by deflocculating hydrous titanium oxide. The pH of the solution is adjusted to 3 or more and less than 9, aged, and then subjected to a desalination treatment (method described in JP 4550753 B2).

The first inorganic oxide particles can be manufactured by the above methods (i) to (v). In order to adjust the coating amount of the titanium oxide particles as the first inorganic oxide particles with silicon-containing hydrated oxide, for example, the following methods (1) to (4) are used.

(1) In the above methods (i) and (iv), by adjusting the amount of a silicon compound added to titanium oxide particles used, the coating amount of silicon-containing hydrated oxide is adjusted. (2) In the above method (iii), by converting the amounts of the resulting titanium oxide-containing composite aqueous sol and silicon dioxide-containing composite aqueous sol into the amounts of metal oxides $TiO_2$ and $SiO_2$, respectively, and adjusting the corresponding amount of $SiO_2$ with respect to the corresponding amount of $TiO_2$, the coating amount of silicon-containing hydrated oxide is adjusted.

(3) In the above method (v), by adjusting the addition amount of organoalkoxysilane used, the coating amount of silicon-containing hydrated oxide is adjusted.

(4) In the above method (ii), the addition amount of the alkyl silicate is adjusted.

In a case where the first inorganic oxide particles are prepared, in a suspension containing titanium oxide particles coated with silicon-containing hydrated oxide, the solid content of the first inorganic oxide particles is preferably 1 to 40% by mass with respect to 100% by mass of the solid content of the entire suspension. The solid content is more preferably 15 to 25% by mass. This is because the solid content of 1% by mass or more increases a solid content concentration and reduces a volatilization load of a solvent to improve productivity, and the solid content of 40% by mass or less can prevent aggregation due to high particle density to reduce defects at the time of application. In a case where the first inorganic oxide particles are prepared, the pH range of the suspension containing the titanium oxide particles coated with silicon-containing hydrated oxide is preferably 3 to 9, and more preferably 4 to 8. This is because the pH of the suspension of 9 or less can suppress a change in volume average particle diameter due to alkali dissolution, and the pH of the suspension of 3 or more can improve a handling property.

In the first inorganic oxide particles, the coating amount of silicon-containing hydrated oxide with respect to the titanium oxide particles is preferably 3 to 30% by mass, more preferably 3 to 10% by mass, and still more preferably 3 to 8% by mass in terms of $SiO_2$. If the coating amount is 3 to 30% by mass, the refractive index of the high refractive index layer 5H can be easily increased, and the coated particles can be stably formed.

Here, the "silicon-containing hydrated oxide" may be a hydrate of an inorganic silicon compound or a hydrolyzate and/or a condensate of an organosilicon compound, but more preferably has a silanol group.

—Others—

The high refractive index layer 5H may contain other inorganic oxide particles in addition to the first inorganic oxide particles. In a case where other inorganic oxide particles are used in combination, various ionic dispersants and protective agents can be used in order to prevent aggregation in charge with the first inorganic oxide particles. Examples of the inorganic oxide particles other than the first inorganic oxide particles include titanium dioxide, zirconium oxide, zinc oxide, synthetic amorphous silica, colloidal silica, alumina, colloidal alumina, lead titanate, red lead, chromium oxide, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide. The content of the above inorganic oxide particles other than the first inorganic oxide particles contained in the high refractive index layer 5H is not particularly limited as long as being in a range that can exhibit an effect.

Incidentally, in a case where the optical reflection film includes a plurality of the high refractive index layers 5H, at least one of the plurality of high refractive index layers 5H only needs to contain the first inorganic oxide particles obtained by coating titanium oxide particles with silicon-containing hydrated oxide. Particularly preferably, all the plurality of high refractive index layers 5H contain the first inorganic oxide particles according to the present invention. In a case where the optical reflection film includes one high refractive index layer 5H, the one high refractive index layer 5H only needs to contain the first inorganic oxide particles.

[First Water-Soluble Polymer]

The first water-soluble polymer contained in the high refractive index layer 5H functions as a binder. The first water-soluble polymer may include the same constituent components as a second water-soluble polymer contained in the low refractive index layer 5L described later or may include different constituent components therefrom. However, the first water-soluble polymer preferably includes different constituent components from the second water-soluble polymer.

The first water-soluble polymer or the second water-soluble polymer described later means a water-soluble polymer in which the mass of an insoluble matter filtered out with a G2 glass filter (maximum pore size: 40 to 50 μm) is 50% by mass or less with respect to the amount of the water-soluble polymer added when being dissolved in water at a concentration of 0.5% by mass at a temperature at which the water-soluble polymer is most dissolved.

Examples of the first water-soluble polymer include a polymer having a reactive functional group, gelatin, a cellulose, and a thickening polysaccharide. These first water-soluble polymers may be used singly or in combination of two or more kinds thereof. As the first water-soluble polymer, a synthetic product may be used, or a commercially available product may be used. Hereinafter, the first water-soluble polymer will be described in detail.

(Polymer Having Reactive Functional Group)

Examples of the polymer having a reactive functional group include a polyvinyl alcohol, a polyvinyl pyrrolidone, an acrylic resin such as polyacrylic acid, an acrylic acid-acrylonitrile copolymer, a potassium acrylate-acrylonitrile copolymer, a vinyl acetate-acrylic acid ester copolymer, or an acrylic acid-acrylic acid ester copolymer, a styrene-acrylic acid resin such as a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer, a styrene-sodium styrene sulfonate copolymer, a styrene-2-hydroxyethyl acrylate copolymer, a styrene-2-hydroxyethyl acrylate-potassium styrene sulfonate copolymer, a styrene-maleic acid copolymer, a styrene-maleic anhydride copolymer, a vinyl naphthalene-acrylic acid copolymer, a vinyl naphthalene-maleic acid copolymer, a vinyl acetate-based copolymer such as a vinyl acetate-maleic acid ester copolymer, a vinyl acetate-crotonic acid copolymer, or a vinyl acetate-acrylic acid copolymer, and salts thereof. Among these polymers, a polyvinyl alcohol is particularly preferably used in the present invention. Hereinafter, a polyvinyl alcohol will be described.

A preferable polyvinyl alcohol includes various modified polyvinyl alcohols in addition to an ordinary polyvinyl alcohol obtained by hydrolyzing polyvinyl acetate.

A polyvinyl alcohol obtained by hydrolyzing polyvinyl acetate has an average polymerization degree preferably of 1,000 or more, particularly preferably of 1,500 to 5,000. The polyvinyl alcohol has a saponification degree preferably of 70 to 100%, particularly preferably of 80 to 99.5%.

Examples of the anion-modified polyvinyl alcohol include a polyvinyl alcohol having an anionic group as described in JP 1-206088 A, a copolymer of a vinyl alcohol and a vinyl compound having a water-soluble group as described in JP 61-237681 A and JP 63-307979 A, and a modified polyvinyl alcohol having a water-soluble group as described in JP 7-285265 A.

Examples of the nonion-modified polyvinyl alcohol include a polyvinyl alcohol derivative obtained by adding a polyalkylene oxide group to a part of a vinyl alcohol as described in JP 7-9758 A, and a block copolymer of a vinyl compound having a hydrophobic group and a vinyl alcohol as described in JP 8-25795 A. Two or more kinds of polyvinyl alcohols having different polymerization degrees, kinds of modification, or the like can be used in combination.

Examples of the cation-modified polyvinyl alcohol include a polyvinyl alcohol having a primary to tertiary amino group or a quaternary ammonium group in a main chain or a side chain of the polyvinyl alcohol as described in JP 61-10483 A, obtained by saponifying a copolymer of an ethylenically unsaturated monomer having a cationic group and vinyl acetate.

Examples of the ethylenically unsaturated monomer having a cationic group include trimethyl-(2-acrylamido-2,2-dimethylethyl) ammonium chloride, trimethyl-(3-acrylamido-3,3-dimethylpropyl) ammonium chloride, N-vinylimidazole, N-vinyl-2-methylimidazole, N-(3-dimethylaminopropyl) methacrylamide, hydroxyethyltrimethylammonium chloride, trimethyl-(2-methacrylamidopropyl) ammonium chloride, and N-(1,1-dimethyl-3-dimethylaminopropyl) acrylamide. A ratio of the cation-modified group-containing monomer in the cation-modified polyvinyl alcohol is 0.1 to 10% by mol, and preferably 0.2 to 5% by mol with respect to vinyl acetate.

(Gelatin)

As the gelatin, various kinds of gelatin which have been conventionally used widely in a field of a silver halide photographic light-sensitive material can be applied. For example, in addition to acid-treated gelatin and alkali-treated gelatin, enzyme-treated gelatin obtained by performing an enzyme treatment during manufacture of the gelatin and a gelatin derivative, that is, gelatin having an amino group, an imino group, a hydroxyl group, or a carboxyl group as a functional group in a molecule thereof, obtained by modification by a treatment with a reagent having a group that can react these groups may be used. A general method for manufacturing gelatin is well known. For example, description in T. H. James: The Theory of Photographic Process 4th. ed. 1977 (Macmillan) paragraph 55, Scientific Photographic Handbook (upper) paragraphs 72 to 75 (Maruzen), and Basic Photographic Engineering-silver salt photograph edition pp. 119 to 124 (Corona Publishing Co., Ltd.) can be referred to. In addition, examples of the gelatin include gelatin described in paragraph IX of Research Disclosure vol. 176, No. 17643 (December 1978).

In a case where gelatin is used as the first water-soluble polymer, a gelatin hardening agent can be added, as necessary.

As the hardening agent that can be used, a known compound used as an ordinary hardening agent for a photographic emulsion layer can be used, and examples thereof include an organic hardening agent such as a vinyl sulfone compound, a urea-formalin condensate, a melamine-formalin condensate, an epoxy-based compound, an aziridine-based compound, an active olefin, or an isocyanate-based compound, and an inorganic polyvalent metal salt such as chromium, aluminum, or zirconium.

(Cellulose)

As a cellulose, a water-soluble cellulose derivative can be preferably used, and examples thereof include a water-soluble cellulose derivative such as carboxymethyl cellulose (cellulose carboxymethyl ether), methylcellulose, hydroxymethyl cellulose, hydroxyethyl cellulose, or hydroxypropyl cellulose, and a carboxylic acid group-containing cellulose such as carboxymethyl cellulose (cellulose carboxymethyl ether) or carboxyethyl cellulose. Examples thereof further include a cellulose derivative such as nitrocellulose, cellulose acetate propionate, cellulose acetate, or cellulose sulfate.

(Thickening Polysaccharide)

The thickening polysaccharide is not particularly limited, and examples thereof include a generally known natural simple polysaccharide, natural complex polysaccharide, synthetic simple polysaccharide, and synthetic complex polysaccharide. For details of these polysaccharides, "Biochemical Encyclopedia (2nd edition), Kagaku-Dojin Publishing Company, INC", "Food Industry" vol. 31 (1988) p. 21, and the like can be referred to.

Here, the thickening polysaccharide is a polymer of a saccharide, has a large number of hydrogen bonding groups in a molecule thereof, and has such a characteristic that a difference between the viscosity at a low temperature and the viscosity at a high temperature is large due to a difference in hydrogen bonding force between molecules depending on temperature. In addition, the thickening polysaccharide increases viscosity probably due to hydrogen bonding with inorganic oxide particles at a low temperature if the inorganic oxide particles are added. The polysaccharide increases the viscosity thereof at 15° C. at 1.0 mPa·s or more by addition, and has viscosity increasing ability preferably of 5.0 mPa·s or more, more preferably of 10.0 mPa·s or more.

Examples of the thickening polysaccharide applicable as the first water-soluble polymer include galactan (for example, agarose or agaropectin), galactomannoglycan (for example, locust bean gum or guaran), xyloglucan (for example, Tamarind gum), glucomannoglycan (for example, konjac mannan, wood-derived glucomannan, or xanthan gum), galactoglucomannoglycan (for example, conifer-derived glycan), arabinogalactoglycan (for example, soybean-derived glycan or microorganism-derived glycan), glucorhamnoglycan (for example, gellan gum), glycosaminoglycan (for example, hyaluronic acid or keratan sulfate), alginic acid and an alginate, and a natural polymer polysaccharide derived from red algae such as agar, κ-carrageenan, λ-carrageenan, ι-carrageenan, or furcellaran. A thickening polysaccharide having no carboxylic acid group or sulfonic acid group as a constitutional unit thereof is preferable from a viewpoint of preventing a decrease in dispersion stability of inorganic oxide particles coexisting in an application liquid. Such a thickening polysaccharide is preferably, for example, a polysaccharide formed only of a pentose such as L-arabitose, D-ribose, 2-deoxyribose, or D-xylose, or a polysaccharide formed only of a hexose such as D-glucose, D-fructose, D-mannose, or D-galactose. Specifically, tamarind seed gum known as xyloglucan in which a main chain is glucose and a side chain is also glucose, guar gum, cationized guar gum, hydroxypropyl guar gum, locust bean gum, or tara gum known as galactomannan in which a main chain is mannose and a side chain is glucose, and arabinogalactan in which a main chain is galactose and a side chain is arabinose can be preferably used. In the present invention, tamarind, guar gum, cationized guar gum, and hydroxypropyl guar gum are particularly preferable.

As the first water-soluble polymer, two or more thickening polysaccharides can be used in combination.

Among the above compounds, polyvinyl alcohol is preferable as the first water-soluble polymer. In a case where polyvinyl alcohol is used, another water-soluble polymer may be used together with polyvinyl alcohol. In this case, the content of another water-soluble polymer used in combination can be 0.5 to 10% by mass with respect to 100% by mass of the solid content of the high refractive index layer 5H.

The first water-soluble polymer has a weight average molecular weight preferably of 1,000 or more and 300,000 or less, more preferably of 3,000 or more and 200,000 or less. The weight average molecular weight in the present invention can be measured by a known method and can be measured, for example, by a static light scattering method, gel permeation chromatography (GPC method), or TOF-MASS. In the present invention, the weight average molecular weight is measured by gel permeation chromatography (GPC method) as a generally known method.

The first water-soluble polymer is contained in an amount preferably of 5.0% by mass or more and 50% by mass or less, more preferably of 10% by mass or more and 40% by mass or less with respect to 100% by mass of the solid content of the high refractive index layer 5H. However, in a case where an emulsion resin is used together with the first water-soluble polymer, for example, the content of the first water-soluble polymer only needs to be 3.0% by mass or more. If the content of the water-soluble polymer is small, at the time of drying after a refractive index layer is applied, a film surface is disturbed, and transparency tends to be degraded. Meanwhile, if the content is 50% by mass or less, the relative content of an inorganic oxide is appropriate, and it is easy to increase a refractive index difference between the high refractive index layer 5H and the low refractive index layer 5L.

[Curing Agent]

The curing agent is used for curing the first water-soluble polymer serving as a binder. The curing agent that can be used together with the first water-soluble polymer is not particularly limited as long as causing a curing reaction with the water-soluble polymer. For example, in a case where polyvinyl alcohol is used as the first water-soluble polymer, boric acid and a salt thereof are preferable as the curing agent. In addition to boric acid and a salt thereof, a known compound can be used. In general, a compound having a group capable of reacting with polyvinyl alcohol or a compound promoting a reaction between different groups possessed by polyvinyl alcohol is used. A compound is appropriately selected to be used. Specific examples of the curing agent include an epoxy-based curing agent (diglycidyl ethyl ether, ethylene glycol diglycidyl ether, 1,4-butanediol diglycidyl ether, 1,6-diglycidyl cyclohexane, N,N-diglycidyl-4-glycidyloxyaniline, sorbitol polyglycidyl ether, glycerol polyglycidyl ether, or the like), an aldehyde-based curing agent (formaldehyde, glyoxal, or the like), an active halogen-based curing agent (2,4-dichloro-4-hydroxy-1,3,5,-s-triazine or the like), an active vinyl-based compound (1,3,5-trisacryloyl-hexahydro-s-triazine, bisvinylsulfonyl methyl ether, or the like), aluminum alum, and borax.

Boric acid or a salt thereof means an oxygen acid having a boron atom as a central atom and a salt thereof, and specific examples thereof include orthoboric acid, diboric acid, metaboric acid, tetraboric acid, pentaboric acid, octaboric acid, and salts thereof.

Boric acid having a boron atom and a salt thereof as a curing agent may be used as a single aqueous solution or as a mixture of two or more kinds thereof. A mixed aqueous solution of boric acid and borax is particularly preferable.

Only a relatively dilute aqueous solution of each of the aqueous solutions of boric acid and borax can be added. However, by mixing both solutions, it is possible to form a dense aqueous solution, and an application liquid can be concentrated. In addition, there is an advantage that the pH of an aqueous solution added can be relatively freely controlled.

In the present embodiment, at least one of boric acid, a salt thereof, and borax is preferably used as a curing agent. In a case where at least one of boric acid, a salt thereof, and borax is used, a hydrogen bond network is more easily formed between the first inorganic oxide particles and an OH group of polyvinyl alcohol as the first water-soluble polymer. As a result, interlayer mixing between the high refractive index layer 5H and the low refractive index layer 5L is suppressed, and it is considered that a preferable near infrared shielding property is achieved. Particularly, in a process of manufacturing an optical reflection film, in a case of using a set type application process for applying a multilayer of the high refractive index layer 5H and the low refractive index layer 5L with a coater, then lowering a film surface temperature of the application film to about 15° C. once, and then drying the film surface, a more preferable effect can be exhibited.

The content of the curing agent in the high refractive index layer 5H is preferably 1 to 10% by mass, and more preferably 2 to 6% by mass with respect to 100% by mass of the solid content of the high refractive index layer 5H.

Particularly, in a case where polyvinyl alcohol is used as the first water-soluble polymer, the total amount of the curing agent used is preferably 1 mg to 500 mg per g of polyvinyl alcohol, and more preferably 20 mg to 200 mg per g of polyvinyl alcohol.

[Surfactant]

The surfactant is used for improving applicability when the high refractive index layer 5H and the low refractive index layer 5L are applied onto a substrate in a process of manufacturing an optical reflection film.

As such a surfactant, an anionic surfactant, a nonionic surfactant, an amphoteric surfactant, and the like can be used, but an anionic surfactant and an amphoteric surfactant are more preferable. Preferable examples of the anionic surfactant include a compound having a hydrophobic group having 8 to 30 carbon atoms and a sulfonic acid group or a salt thereof in one molecule thereof. As the amphoteric surfactant, a sulfobetaine type, a carbobetaine type, and the like are preferably used.

Examples of the anionic surfactant include a surfactant selected from the group consisting of an alkylbenzenesulfonate, an alkylnaphthalene sulfonate, an alkane or olefin sulfonate, an alkyl sulfate, a polyoxyethylene alkyl or alkylaryl ether sulfate, an alkyl phosphate, an alkyl diphenyl ether disulfonate, an ether carboxylate, an alkylsulfosuccinate, an α-sulfofatty acid ester, and a fatty acid salt, a condensate of a higher fatty acid and an amino acid, and a naphthenic acid salt. An anionic surfactant preferably used is a surfactant selected from the group consisting of an alkylbenzenesulfonate (particularly a linear alkyl salt), an alkane or olefin sulfonate (particularly a secondary alkanesulfonate and an α-olefin sulfonate), an alkyl sulfate, a polyoxyethylene alkyl or alkylaryl ether sulfate (particularly a polyoxyethylene alkyl ether sulfate), an alkyl phosphate (particularly a monoalkyl salt), an ether carboxylate, an alkylsulfosuccinate, an α-sulfofatty acid ester, and a fatty acid salt. An anionic surfactant particularly preferably used is an alkyl sulfosuccinate.

As the amphoteric surfactant, a surfactant selected from the group consisting of an imidazoline type, an amidopropyl betaine type, a sulfobetaine type, an amidoamine oxide type, a carbobetaine type, and the like can be used. An amphoteric surfactant preferably used is a surfactant selected from the group consisting of a sulfobetaine type and a carbobetaine type.

The content of a surfactant in the high refractive index layer 5H is preferably 0.001 to 0.1% by mass, and more preferably 0.005 to 0.05% by mass with respect to 100% by mass of the total mass of the application liquid of the high refractive index layer 5H.

[Emulsion Resin]

The emulsion resin is formed of resin particles obtained by emulsion polymerization of an oil-soluble monomer using a polymerization initiator while the oil-soluble monomer is maintained in an emulsion state in an aqueous solution containing a dispersant.

Examples of a resin constituting the emulsion resin (resin particles) include a homopolymer or a copolymer of an ethylene-based monomer such as an acrylate, a methacrylate, a vinyl-based compound, or a styrene-based compound, or a diene-based compound such as butadiene or isoprene. Examples thereof include an acrylic resin, a styrene-butadiene-based resin, and an ethylene-vinyl acetate-based resin.

In general, examples of a dispersant used at the time of emulsion polymerization of the emulsion resin include a low molecular dispersant such as an alkyl sulfonate, an alkylbenzene sulfonate, diethylamine, ethylenediamine, or a quaternary ammonium salt, and further include a polymer dispersant such as oxyethylene nonylphenyl ether, polyethylene lauric acid ether, hydroxyethyl cellulose, or polyvinyl pyrrolidone, and a polymer dispersant containing a hydroxy group.

The polymer dispersant containing a hydroxy group is a polymer dispersant having a weight average molecular weight of 10,000 or more and having a hydroxy group replaced at a side chain or a terminal. Examples thereof include an acrylic polymer such as sodium polyacrylate or polyacrylamide, copolymerized with 2-ethylhexyl acrylate, a polyether such as polyethylene glycol or polypropylene glycol, and a polyvinyl alcohol. Polyvinyl alcohol is particularly preferable.

The polyvinyl alcohol used as a polymer dispersant includes, in addition to an ordinary polyvinyl alcohol obtained by hydrolyzing polyvinyl acetate, a modified polyvinyl alcohol such as a cation-modified polyvinyl alcohol, an anion-modified polyvinyl alcohol having an anionic group such as a carboxyl group, or a silyl-modified polyvinyl alcohol having a silyl group.

A polyvinyl alcohol has a larger effect of suppressing occurrence of cracking with a higher average polymerization degree. However, if the average polymerization degree is 5000 or less, the viscosity of the emulsion resin is not high, and the emulsion resin is easily handled during manufacture. Therefore, the average polymerization degree is preferably 300 to 5,000, more preferably 1500 to 5000, and particularly preferably 3000 to 4500. The polyvinyl alcohol has a saponification degree preferably of 70 to 100% by mol, more preferably of 80 to 99.5% by mol.

An emulsion containing the emulsion resin preferably has a pH of 3 to 10 from a viewpoint of a mixing property with a resin binder, inorganic oxide particles, other additives, and the like, and Tg of the resin is preferably 100° C. or lower.

For example, the above homopolymer or copolymer of an ethylene-based monomer such as an acrylate, a methacrylate, a vinyl-based compound, or a styrene-based compound, or a diene-based compound such as butadiene or isoprene, used as the emulsion resin, is commercially available. Examples thereof include Mowinyl 718A, 710A, 731A, LDM 7582, 5450, and 6960 (manufactured by Nippon Synthetic Chemical Industry Co., Ltd.), Superflex 150, 170, 300, and 500M (manufactured by First Industrial Pharmaceutical Co., Ltd.), Adeka Bontiter HUX-232, HUX-380, HUX-386, HUX-830, and HUX-895 (manufactured by ADEKA Corporation), AE116, AE120A, AE200A, AE336B, AE981A, and AE986B (manufactured by ETEC Corporation), and ACRIT UW-309, UW-319SX, and UW-520 (manufactured by Taisei Fine Chemical Co., Ltd.).

As the emulsion resin, any one of an anionic emulsion resin, a cationic emulsion resin, and a nonionic emulsion resin can be used. However, in a water-dispersible hydrophobic resin-containing layer in the optical reflection film of the present invention, an anionic emulsion resin is preferably used in combination with an anionic surfactant.

—Content (Emulsion Resin)—

A content ratio of the emulsion resin is 5% by mass to 45% by mass, and preferably 10% by mass to 30% by mass with respect to the first water-soluble polymer as the binder resin of the high refractive index layer 5H constituting the lowermost layer C or the uppermost layer A from viewpoints of flexibility, film strength, infrared reflectance, and the like.

—Particle Diameter (Emulsion Resin)—

The average particle diameter of the emulsion resin used here is preferably 150 nm or less, and particularly preferably 60 nm or less in terms of volume average particle diameter. By the above average particle diameter of the emulsion resin, the haze of an obtained optical reflection film is reduced, and transparency can be improved.

The volume average particle diameter referred to here is a value determined by measuring emulsion resin particles with a measuring apparatus (for example, MASTERSIZER 2000 manufactured by MALVERN Co., Ltd.) using a laser diffraction scattering method or a dynamic light scattering method. The refractive index of the emulsion resin is not particularly limited, but is preferably 1.3 to 1.7, and more preferably 1.4 to 1.6. In the above range, the refractive index of the emulsion resin is close to that of the water-soluble resin. Therefore, the haze of an obtained optical reflection film can be reduced. The above emulsion resin has a glass transition temperature (Tg) preferably of 20° C. or lower, more preferably of −30 to 10° C. from a viewpoint of enhancing flexibility.

[Additive]

For the high refractive index layer 5H, various additives can be used as necessary. The content of the additive in the high refractive index layer 5H is preferably 0 to 20% by mass with respect to 100% by mass of the solid content of the high refractive index layer 5H. Examples of the additive are described below.

(Amino Acid Having an Isoelectric Point of 6.5 or Less)

The high refractive index layer 5H may contain an amino acid having an isoelectric point of 6.5 or less as an additive. By inclusion of an amino acid, dispersibility of the inorganic oxide particles in the high refractive index layer 5H can be improved.

Here, the amino acid is a compound having an amino group and a carboxyl group in the same molecule and may be any type of amino acid such as an α-type, a β-type, or a γ-type. Some amino acids have optical isomers. However, there is no difference in effects between optical isomers, and either isomer can be used singly, or a racemic form can be used.

A detailed explanation of the amino acid can be referred to description of Chemical Dictionary 1 Compact Edition (published by Kyoritsu Publishing Co., Ltd. in 1960) at pp. 268 to 270.

Specific preferable examples of the amino acid include aspartic acid, glutamic acid, glycine, and serine. Glycine and serine are particularly preferable.

The isoelectric point of an amino acid means a pH value at which positive and negative charges in a molecule are balanced at a specific pH and a charge as a whole is zero. The isoelectric point of each amino acid can be determined by isoelectric point electrophoresis at low ionic strength.

As other additives, various known additives such as UV absorbers described in JP 57-74193 A, JP 57-87988 A, and JP 62-261476 A, anti-fading agents and various anionic, cationic, and nonionic surfactants described in JP 57-74192 A, JP 57-87989 A, JP 60-72785 A, JP 61-146591 A, JP 1-95091 A, and JP 3-13376 A, or fluorescent whitening agents, a pH regulator such as sulfuric acid, phosphoric acid, acetic acid, citric acid, sodium hydroxide, potassium hydroxide, or potassium carbonate, an antifoaming agent, a lubricant such as diethylene glycol, a preservative, an antistatic agent, and a matting agent described in JP 59-42993 A, JP 59-52689 A, JP 62-280069 A, JP 61-242871 A, and JP 4-219266 A may be included.

As described above, the present invention causes an interaction between silicon-containing hydrated oxide and the first water-soluble polymer to exhibit due to inclusion of titanium oxide particles coated with the silicon-containing hydrated oxide in the high refractive index layer 5H, suppresses interlayer mixing between the high refractive index layer 5H and the low refractive index layer 5L, and can prevent a problem such as degradation or chalking of a binder due to a photocatalytic activity of the titanium oxide particles. Therefore, the optical reflection film of the present invention has excellent durability and film flexibility, high visible light transmittance, and an excellent near infrared shielding property.

<Low Refractive Index Layer 5L>

The low refractive index layer 5L contains the second water-soluble polymer and second inorganic oxide particles as essential components and may further contain at least one selected from the group consisting of a curing agent, a surfactant, an emulsion resin, and various additives as necessary.

Particularly, in a case where the low refractive index layer 5L constitutes one of the lowermost layer C and the uppermost layer A of the optical interference film 5, the low refractive index layer 5L preferably contains an emulsion resin. Particularly, the low refractive index layer 5L constituting the uppermost layer A preferably contains an emulsion resin.

The refractive index of the low refractive index layer 5L as described above is preferably 1.10 to 1.60, and more preferably 1.30 to 1.50.

The thickness of each of the low refractive index layers 5L is preferably 20 to 800 nm, and more preferably 50 to 350 nm. However, it is assumed that the film thickness of each of the low refractive index layers 5L is set such that the film thicknesses of the uppermost layer A, the intermediate layers B, and the lowermost layer C satisfy the above relationship.

Next, each component constituting the low refractive index layer 5L will be described in detail.

[Second Inorganic Oxide Particles]

Silica (silicon dioxide) is preferably used as the second inorganic oxide particles contained in the low refractive index layer 5L, and specific examples thereof include synthetic amorphous silica and colloidal silica. Among these compounds, an acidic colloidal silica sol is more preferably used, and a colloidal silica sol dispersed in an organic solvent is still more preferably used. In order to further reduce the refractive index, hollow fine particles having pores inside the particles can be used as the second inorganic oxide particles, and hollow fine particles of silica (silicon dioxide) are particularly preferably used. Known inorganic oxide particles other than silica can also be used.

The colloidal silica used as the second inorganic oxide particles is obtained by heating and aging a silica sol obtained by double decomposition of sodium silicate with an acid or the like or causing sodium silicate to pass through an ion exchange resin layer, and is described, for example, in JP 57 14091 A, JP 60-219083 A, JP 60-219084 A, JP 61-20792 A, JP 61-188183 A, JP 63-17807 A, JP 4-93284 A, JP 5-278324 A, JP 6-92011 A, JP 6-183134 A, JP 6-297830 A, JP 7-81214 A, JP 7-101142 A, JP 7-179029 A, JP 7-137431 A, and WO 94/26530 A.

As the colloidal silica, a synthetic product may be used, or a commercially available product may be used. A surface of the colloidal silica may be cation-modified, or may be treated with Al, Ca, Mg, Ba, or the like.

The hollow fine particles used as the second inorganic oxide particles have an average particle pore diameter preferably of 3 to 70 nm, more preferably of 5 to 50 nm, still more preferably of 5 to 45 nm. Note that the average particle pore diameter of the hollow fine particles is an average value of inner diameters of the hollow fine particles. If the average particle pore diameter of the hollow fine particles is in the above range, the refractive index of the low refractive index layer 5L is sufficiently lowered. The average particle pore diameter is obtained by randomly observing the pore diameters of 50 or more pore particles observable as a circle, an ellipse, or a substantial circle or ellipse by observation with an electron microscope, determining the pore diameters of the particles, and calculating a number average value thereof. Note that the average particle pore diameter here means a minimum distance among distances obtained by sandwiching an outer edge of a pore diameter observable as a circle, an ellipse, or a substantial circle or ellipse between two parallel lines.

—Content (Second Inorganic Oxide Particles)—

The content of the second inorganic oxide particles in the low refractive index layer 5L is preferably 0.1 to 70% by mass, more preferably 30 to 70% by mass, and still more preferably 45 to 65% by mass with respect to 100% by mass of the solid content of the low refractive index layer 5L.

—Particle Diameter (Second Inorganic Oxide Particles)—

The second inorganic oxide particles (preferably silicon dioxide) preferably have a primary average particle diameter of 3 to 100 nm. The average particle diameter of primary particles of silicon dioxide dispersed in a state of primary particles (primary average particle diameter in a state of dispersion before application) is more preferably 3 to 50 nm, still more preferably 3 to 40 nm, particularly preferably 3 to 20 nm, and most preferably 4 to 10 nm. The average particle diameter of the secondary particles is preferably 30 nm or less from a viewpoint of low haze and excellent visible light transmission.

The particle diameters of the second inorganic oxide particles can also be determined from a volume average particle diameter in addition to the primary average particle diameter.

The primary average particle diameter and the volume average particle diameter of the second inorganic oxide particles are similar to those of the first inorganic oxide particles.

[Second Water-Soluble Polymer]

Specific examples of the second water-soluble polymer, a preferable weight average molecular weight thereof, and the like are similar to those described above in the section of the first water-soluble polymer, and therefore description thereof is omitted here. Particularly, a polyvinyl alcohol is preferably used as the second water-soluble polymer, and a polyvinyl alcohol of a different kind from a polyvinyl alcohol preferably used as the first water-soluble polymer is more preferably used. Here, the polyvinyl alcohol of a different kind from the first water-soluble polymer means a polyvinyl alcohol in which at least one selected from the group consisting of the kind of modification, the saponification degree, the polymerization degree, and the weight average molecular weight is different from that of a polyvinyl alcohol used as the first water-soluble polymer.

For the second water-soluble polymer, another water-soluble polymer may be used together with a polyvinyl alcohol. The content of another polymer used in combination is preferably 0.5 to 10% by mass with respect to 100% by mass of the solid content of the low refractive index layer 5L.

The content of the second water-soluble polymer in the low refractive index layer 5L is preferably 30 to 99.9% by mass, and more preferably 35 to 55% by mass with respect to 100% by mass of the solid content of the low refractive index layer 5L.

[Curing Agent]

The curing agent is used for curing the second water-soluble polymer as a binder and is not particularly limited as long as causing a curing reaction with the second water-soluble polymer. Particularly, in a case where a polyvinyl alcohol is used as the second water-soluble polymer, at least one of boric acid, a salt thereof, and borax is preferable as the curing agent. In addition to these compounds, known compounds can also be used.

The content of the curing agent in the low refractive index layer 5L is preferably 1 to 10% by mass, and more preferably 2 to 6% by mass with respect to 100% by mass of the solid content of the low refractive index layer 5L.

Particularly, in a case where a polyvinyl alcohol is used as the second water-soluble polymer, the total amount of the curing agent used is preferably 1 mg to 500 mg per g of the polyvinyl alcohol, and more preferably 20 mg to 200 mg per g of the polyvinyl alcohol.

Specific examples of the curing agent and the like are similar to those of the curing agent contained in the high refractive index layer 5H described above, and therefore description thereof is omitted here.

[Surfactant]

Like the high refractive index layer 5H, the low refractive index layer 5L preferably contains a surfactant from a viewpoint of applicability and can use a surfactant similar to the above-described surfactant contained in the high refractive index layer 5H, and therefore description thereof is omitted here.

The content of the surfactant in the low refractive index layer 5L is preferably 0.001 to 0.1% by mass, and more preferably 0.005 to 0.05% by mass with respect to 100% by mass of the total mass of the application liquid of the low refractive index layer 5L.

[Emulsion Resin]

As the emulsion resin contained in the low refractive index layer 5L, a similar emulsion resin to that contained in the high refractive index layer 5H can be used. In addition, the content ratio of the emulsion resin, the average particle diameter thereof, and the volume average particle diameter thereof are similar to those described in the high refractive index layer 5H, and therefore description thereof is omitted here.

[Additive]

Various additives can be used for the low refractive index layer 5L as necessary. Various additives in the low refractive index layer 5L can be the same as those used for the high refractive index layer 5H described above, and therefore description thereof is omitted here.

<Substrate 3>

The substrate 3 serves as a support of the optical reflection film 1. The thickness of the substrate 3 is preferably 5 to 200 µm, and more preferably 15 to 150 µm. The substrate 3 may be obtained by laminating or bonding two or more substrates, and in this case, the kinds thereof may be the same or different from each other.

The substrate 3 applied to the optical reflection film 1 is not particularly limited as long as being transparent, and various resin films can be used. Examples of the resin film include a polyolefin film (polyethylene, polypropylene, or the like), a polyester film (polyethylene terephthalate, polyethylene naphthalate, or the like), polyvinyl chloride, and cellulose triacetate, and a polyester film is preferable. The polyester film (hereinafter, referred to as "polyester") is not particularly limited, but is preferably a polyester containing a dicarboxylic acid component and a diol component as main constituent components and having a film-forming property. Examples of the dicarboxylic acid component as a main constituent component include terephthalic acid, isophthalic acid, phthalic acid, 2,6-naphthalene dicarboxylic acid, 2,7-naphthalene dicarboxylic acid, diphenyl sulfone dicarboxylic acid, diphenyl ether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, and phenyl indane dicarboxylic acid. Examples of the diol component include ethylene glycol, propylene glycol, tetramethylene glycol, cyclohexane dimethanol, 2,2-bis(4-hydroxyphenyl) propane, 2,2-bis(4-hydroxyethoxyphenyl) propane, bis(4-hydroxyphenyl) sulfone, bisphenol fluorene dihydroxyethyl ether, diethylene glycol, neopentyl glycol, hydroquinone, and cyclohexane diol. Among polyesters containing these compounds as main constituent components, a polyester containing terephthalic acid or 2,6-naphthalene dicarboxylic acid as a dicarboxylic acid component serving as a main constituent component and containing ethylene glycol or 1,4-cyclohexanedimethanol as a diol component serving as a main constituent component is preferable from viewpoints of transparency, mechanical strength, dimensional stability, and the like. Among the polyesters, a polyester containing polyethylene terephthalate or polyethylene naphthalate as a main constituent component, a copolymerized polyester formed of terephthalic acid, 2,6-naphthalene dicarboxylic acid, and ethylene glycol, and a polyester containing a mixture of two or more of these polyesters as a main constituent component are preferable.

The substrate 3 has a transmittance preferably of 85% or more, particularly preferably of 90% or more in a visible light region specified in JIS R3106-1998. The above transmittance or more of the substrate 3 is advantageous from a viewpoint that the transmittance in a visible light region specified in JIS R3106-1998 is set to 50% or more when being formed into an optical reflection film, and is preferable.

The resin film used as the substrate may be an unstretched film or a stretched film. A stretched film is preferable from viewpoints of improvement in strength and suppression of thermal expansion.

The substrate 3 can be manufactured by a conventionally known general method. For example, an unstretched substrate which is substantially amorphous and unoriented can be manufactured by melting a resin as a material with an extruder, extruding the resin with a circular die or a T-die, and rapidly cooling the resin. In addition, a stretched substrate can be manufactured by stretching an unstretched substrate in a flow (longitudinal axis) direction of the substrate or in a (transverse axis) direction perpendicular to the flow direction of the substrate by a known method such as uniaxial stretching, tenter type sequential biaxial stretching, tenter type simultaneous biaxial stretching, or tubular type simultaneous biaxial stretching. In this case, the stretching magnification can be appropriately selected according to a resin as a raw material of the substrate but is preferably 2 to 10 times in each of the longitudinal axis direction and the transverse axis direction.

The substrate 3 may be subjected to a relaxation treatment or an off-line heat treatment from a viewpoint of dimensional stability. The relaxation treatment is preferably performed in a step after heat setting is performed in a step of stretching and forming the polyester film and before the polyester film is wound in a tenter for lateral stretching or after the polyester film leaves the tenter. The relaxation treatment is performed preferably at a treatment temperature of 80 to 200° C., and more preferably at a treatment temperature of 100 to 180° C. In addition, in both the longitudinal direction and the transverse direction, the relaxation treatment is performed at a relaxation ratio of preferably in a range of 0.1 to 10%, more preferably in a range of 2 to 6%. The relaxed substrate is subjected to the following off-line heat treatment, and thereby has better heat resistance and better dimensional stability.

The substrate 3 is preferably obtained by applying an undercoat layer application liquid on one surface or both surfaces thereof by an in-line method in a film forming process, that is, preferably has been subjected to in-line undercoating. Examples of a resin used for the undercoat layer application liquid include a polyester resin, an acrylic modified polyester resin, a polyurethane resin, an acrylic resin, a vinyl resin, a vinylidene chloride resin, a polyethyleneimine vinylidene resin, a polyethyleneimine resin, a polyvinyl alcohol resin, a modified polyvinyl alcohol resin, and gelatin, and any of these resins can be preferably used. Conventionally known additives can be added to an undercoat layer formed using these resins. A known method such as roll coating, gravure coating, knife coating, dip coating, or spray coating can be applied to application of the undercoat layer application liquid. The application amount of the above undercoat layer is preferably about 0.01 to 2 g/m$^2$ (dry state).

<Method for Manufacturing Optical Reflection Film 1>

A method for manufacturing the optical reflection film 1 is not particularly limited, and any method can be used as long as at least two units each including the high refractive index layer 5H and the low refractive index layer 5L can be formed on the substrate 3.

Preferable examples of the method for manufacturing the optical reflection film 1 include a method for simultaneously applying the high refractive index layer 5H and the low refractive index layer 5L onto a main surface of the substrate 3 so as to form a multilayer and drying the resulting product to form a laminate. More specifically, a method for simultaneously applying the high refractive index layer 5H and the low refractive index layer 5L onto the substrate 3 so as to form a multilayer and drying the resulting product to form an optical reflection film including the high refractive index layer 5H and the low refractive index layer 5L.

Preferable examples of an application method include a curtain application method, and a slide bead application method using a hopper and an extrusion coating method described in U.S. Pat. Nos. 2,761,419 B2 and 2,761,791 B2.

A solvent for preparing the high refractive index layer 5H application liquid and the low refractive index layer 5L application liquid is not particularly limited, but water, an organic solvent, or a mixed solvent thereof is preferable. In consideration of environment due to scattering of an organic solvent, water or a mixed solvent of water and a small amount of an organic solvent is more preferable, and water is particularly preferable.

Examples of the organic solvent used here include an alcohol such as methanol, ethanol, 2-propanol, or 1-butanol, an ester such as ethyl acetate, butyl acetate, propylene glycol monomethyl ether acetate, or propylene glycol monoethyl ether acetate, an ether such as diethyl ether, propylene glycol monomethyl ether, or ethylene glycol monoethyl ether, an amide such as dimethylformamide or N-methylpyrrolidone, and a ketone such as acetone, methyl ethyl ketone, acetylacetone, or cyclohexanone. These organic solvents may be used singly or in combination of two or more kinds thereof. Particularly, the solvent of the application liquid is preferably water or a mixed solvent of water and methanol, ethanol, 2-propanol, or ethyl acetate, and more preferably water from a viewpoint of environment, ease of operation, or the like.

When a mixed solvent of water and a small amount of organic solvent is used, the content of water in the mixed solvent is preferably 80 to 99.9% by mass, and more preferably 90 to 99.5% by mass with respect to 100% by mass of the total mass of the mixed solvent. Here, this is because volume fluctuation due to volatilization of a solvent can be reduced, and handling is improved by setting the content of water to 80% by mass or more, and homogeneity upon addition of a liquid is increased, and stable liquid physical properties can be obtained by setting the content of water to 99.9% by mass or less.

The concentration of the first water-soluble polymer in the high refractive index layer 5H application liquid is preferably 1 to 10% by mass. The concentration of the first inorganic oxide particles in the high refractive index layer 5H application liquid is preferably 1 to 50% by mass.

The concentration of the second water-soluble polymer in the low refractive index layer 5L application liquid is preferably 1 to 10% by mass. The concentration of the second inorganic oxide particles in the low refractive index layer 5L application liquid is preferably 1 to 50% by mass.

A method for preparing the high refractive index layer 5H application liquid and the low refractive index layer 5L application liquid is not particularly limited, and examples thereof include a method for adding inorganic oxide particles, a water-soluble polymer, and other additives added as necessary, and stirring and mixing these. At this time, the order of adding the components is not particularly limited. The components may be sequentially added and mixed while being stirred or may be added at once and mixed while being stirred. The viscosity thereof is adjusted to an appropriate value further using a solvent as necessary.

In the present embodiment, it is preferable to form the high refractive index layer 5H using an aqueous high refractive index layer 5H application liquid prepared by adding and dispersing the first inorganic oxide particles. At this time, preparation is preferably performed by adding a sol having a pH of 5.0 or more and 7.5 or less and a negative zeta potential of the particles as the first inorganic oxide particles to the high refractive index layer 5H application liquid.

In a case of using a slide bead application method, the temperature of each of the high refractive index layer 5H application liquid and the low refractive index layer 5L application liquid for simultaneous multilayer application is preferably in a temperature range of 25 to 60° C., and more preferably in a temperature range of 30 to 45° C. In a case of using a curtain application method, the temperature range is preferably 25 to 60° C., and more preferably 30 to 45° C.

The viscosity of each of the high refractive index layer 5H application liquid and the low refractive index layer 5L application liquid for simultaneous multilayer application is not particularly limited. However, in a case of using the slide bead application method, the viscosity is preferably in a range of 5 to 500 mPa·s, and more preferably in a range of 10 to 200 mPa·s in the above preferable temperature range of the application liquids. In a case of using the curtain application method, the viscosity is preferably in a range of 5 to 1200 mPa·s, and more preferably in a range of 25 to 500 mPa·s in the above preferable temperature range of the application liquids. In such a range of viscosity, simultaneous multilayer application can be performed efficiently.

The viscosity of the application liquid at 15° C. is preferably 100 mPa·s or more, more preferably 100 to 30,000 mPa·s, still more preferably 3,000 to 30,000 mPa·s, and most preferably 5,000 to 30,000 mPa·s.

As a preferable application and drying method, the high refractive index layer 5H application liquid and the low refractive index layer 5L application liquid are heated to 30° C. or higher, the application liquids are applied, and then the application film thus formed is cooled once to a temperature of 1 to 15° C. and dried at 10° C. or higher. More preferably, drying is performed under conditions of a wet-bulb temperature of 5 to 50° C. and a film surface temperature of 10 to 50° C. As a cooling method immediately after application, a horizontal set method is preferable from a viewpoint of uniformity of a formed application film.

<Other Configurations>

The optical reflection film 1 may include one or more functional layers for further adding functions on a surface having the optical interference film 5 not disposed in the substrate 3 or above the uppermost layer A of the optical interference film 5. Examples of such a functional layer include a conductive layer, an antistatic layer, a gas barrier layer, an easy adhesion layer, an antifouling layer, a deodorant layer, an anti-sticking, a slippery layer, a hard coat layer, a wear resistant layer, an antirefection layer, an electromagnetic wave shielding layer, an ultraviolet absorbing layer, an infrared absorbing layer, a print layer, a fluorescent emitting layer, a hologram layer, a release layer, a pressure-sensitive adhesive layer, an adhesive layer, an infrared cut layer (a metal layer or a liquid crystal layer) other than the above high refractive index layer 5H and the low refractive index layer 5L, a colored layer (visible light absorbing layer), and an interlayer film layer used for a laminated glass. The order of laminating these functional layers is not particularly limited.

For example, if this optical reflection film 1 can be bonded to the device 200 such as a window glass, as illustrated in the drawing, as a preferable example, the pressure-sensitive adhesive layer 7 is laminated above the optical interference film 5 disposed on one main surface side of the substrate 3, and a hard coat layer (not illustrated here) is applied onto the other main surface side of the substrate 3 opposite to the pressure-sensitive adhesive layer 7. As another example, the pressure-sensitive adhesive layer, the substrate 3, the optical interference film 5, and the hard coat layer may be laminated in this order. Furthermore, another functional layer, a substrate, an infrared absorbing agent, or the like may be included.

Examples of the curable resin used in the hard coat layer include a thermosetting resin and an ultraviolet curable resin. However, an ultraviolet curable resin is preferable because of easy molding. Among the ultraviolet curable resins, a resin having a pencil hardness of at least 2H is more preferable. Such curable resins can be used singly or in combination of two or more kinds thereof.

Examples of the ultraviolet curable resin include (meth) acrylate, urethane acrylate, polyester acrylate, epoxy acrylate, an epoxy resin, and an oxetane resin. These resins can also be used as a solvent-free resin composition.

In a case of using the ultraviolet curable resin, a photopolymerization initiator is preferably added in order to accelerate curing.

Examples of the photopolymerization initiator include an acetophenone, a benzophenone, a ketal, an anthraquinone, a thioxanthone, an azo compound, a peroxide, a 2,3-dialkyldione compound, a disulfide compound, a thiuram compound, and a fluoroamine compound. Specific examples of the photopolymerization initiator include an acetophenone such as 2,2'-diethoxyacetophenone, p-dimethylacetophenone, 1-hydroxycyclohexyl phenyl ketone, 1-hydroxydimethyl phenyl ketone, 2-methyl-4'-methylthio-2-morpholinopropiophenone, or 2-benzyl-2-dimethylamino-1-(4-morpholinophenyl)-butanone 1, a benzoin such as benzoin methyl ether, benzoin ethyl ether, benzoin isopropyl ether, or benzyl dimethyl ketal, a benzophenone such as benzophenone, 2,4'-dichlorobenzophenone, 4,4'-dichlorobenzophenone, or p-chlorobenzophenone, 2,4,6-trimethylbenzoyldiphenylphosphine oxide, an anthraquinone, and a thioxanthone. These photopolymerization initiators may be used singly, in combination of two or more kinds thereof, or in a eutectic mixture. Particularly, an acetophenone is preferably used from viewpoints of stability of a curable composition, polymerization reactivity, and the like.

As the photopolymerization initiator, a commercially available product may be used, and preferable examples thereof include Irgacure (registered trademark) 819, 184, 907, and 651 manufactured by BASF Japan Ltd.

The thickness of the hard coat layer is preferably 0.1 µm to 50 µm, and more preferably 1 to 20 µm from viewpoints of improving a hard coat property and improving transparency of the optical reflection film.

A method for forming the hard coat layer is not particularly limited, and examples thereof include a method for preparing a hard coat layer application liquid containing the above components, then applying the application liquid with a wire bar or the like, and curing the application liquid by heat and/or UV to form a hard coat layer.

The above is applied similarly to inner bonding in which the optical reflection film 1 is bonded to an inner side of the window glass 200 and outer bonding in which the optical reflection film 1 is bonded to an outer side thereof.

The optical reflection film 1 as described above can be applied to a wide range of fields. For example, the optical reflection film 1 is bonded to the device 200 exposed to sunlight for a long time, such as an outdoor window of a building or an automobile window, and shields light in a targeted wavelength range. In addition, the optical reflection film 1 is used as a window bonding film, a film for an agricultural vinyl house, or the like mainly in order to enhance weather resistance. Particularly, the optical reflection film 1 is suitable for a member bonded to a base such as glass or a resin substituting for glass directly or via an adhesive.

<<Optical Reflector 100>>

Figure 2:
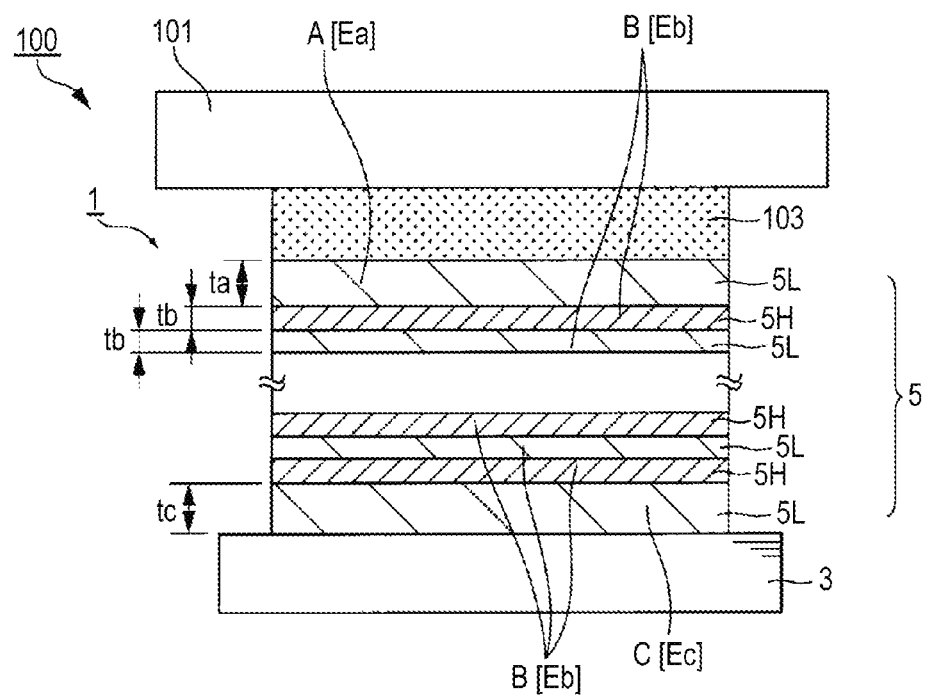
FIG. 2 is a schematic cross-sectional view for explaining a configuration of an optical reflector of an embodiment.

FIG. 2 is a schematic cross-sectional view for explaining a configuration of an optical reflector of the embodiment. As illustrated in FIG. 2, an optical reflector 100 of the embodiment includes the optical reflection film 1, a base 101, and an adhesive layer 103 sandwiched between the optical reflection film 1 and the base 101.

Specific examples of the base 101 include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, an urethane resin, a polyvinyl acetate resin, a polyvinyl alcohol resin, a styrene resin, a vinyl chloride resin, a metal plate, and ceramic. The kind of resin may be any of a thermoplastic resin, a thermosetting resin, an ionizing radiation curable resin, and two or more of these resins may be used in combination. The base 101 used here can be manufactured by a known method such as extrusion molding, calender molding, injection molding, blow molding, or compression molding. The thickness of the base is not particularly limited, but is usually 0.1 mm to 5 cm.

The adhesive layer 103 is used for bonding the optical reflection film 1 to the base 101. The adhesive layer 103 as described above is disposed between the optical interference film 5 and the base 101 in the optical reflection film 1 as illustrated in the drawing. Alternatively, in contrast to the illustrated example, the adhesive layer 103 is disposed between the substrate 3 and the base 101 in the optical reflection film 1.

As the adhesive layer 103 as described above, an adhesive containing a photocurable or thermosetting resin as a main component can be used.

The adhesive layer 103 preferably has durability against ultraviolet rays and is preferably an acrylic pressure-sensitive adhesive or a silicone-based pressure-sensitive adhesive. An acrylic pressure-sensitive adhesive is preferable from viewpoints of pressure-sensitive adhesive properties and cost. Particularly, a solvent type is preferable in the acrylic pressure-sensitive adhesive because of easy control of peeling strength. In a case where a solution polymerized polymer is used as the acrylic solvent-based pressure-sensitive adhesive, a known monomer can be used as a monomer therefor.

As the adhesive layer 103, a polyvinyl butyral-based resin used as an intermediate layer of a laminated glass or an ethylene-vinyl acetate copolymer-based resin may be used. Specific examples thereof include a plastic polyvinyl butyral (manufactured by Sekisui Chemical Co., Ltd, manufactured by Mitsubishi Monsanto Co., Ltd., or the like), an ethylene-vinyl acetate copolymer (Duramin manufactured by Du Pont Co., Ltd. or manufactured by Takeda Pharmaceutical Co., Ltd.), and a modified ethylene-vinyl acetate copolymer (Melthene G manufactured by Tosoh Corporation). Note that an ultraviolet absorber, an antioxidant, an antistatic agent, a thermal stabilizer, a lubricant, a filler, a colorant, an adhesion regulator, or the like may be appropriately added and blended to the adhesive layer 103

The optical reflector 100 as described above is preferably disposed such that the optical interference film 5 is positioned closer to an incident side of external light than the adhesive layer 103. In a case where the optical reflector 100 is attached to a window glass or the like, the optical reflector 100 is preferably disposed such that the optical reflection film 1 is sandwiched between the window glass and the base 101. This is preferable because the optical reflection film 1 can be sealed from ambient gas such as moisture and excellent durability can be obtained.

<Effects of Optical Reflection Film 1 and Optical Reflector 100>

The optical reflection film 1 having the above configuration and the optical reflector 100 using the optical reflection film 1 limit the elastic moduli and the film thickness ratio of the uppermost layer A and the intermediate layers B in the optical interference film 5 formed by alternately laminating the high refractive index layer 5H and the low refractive index layer 5L. As described in the following Examples, the optical reflection film 1 and the optical reflector 100 using the optical reflection film 1 prevent occurrence of cracking or peeling of the optical interference film 5 without reducing light shielding performance in long-term use, and improve weather resistance.

EXAMPLES

Hereinafter, the present invention will be specifically described with reference to Examples, but the present invention is not limited thereto. Incidentally, expression "part" or "%" used in Examples means "part by mass" or "% by mass" unless otherwise particularly specified.

Example 1

[1. Preparation of Low Refractive Index Layer Application Liquid L1 for Lowermost Layer]

320 parts by mass of colloidal silica (10% by mass) (Snowtex OXS, average particle diameter of primary particles=4 to 6 nm; manufactured by Nissan Chemical Industries, Ltd.), 50 parts by mass of a boric acid aqueous solution (3% by mass), 385 parts by mass of polyvinyl alcohol (4% by mass) (JP-45; polymerization degree: 4500, saponification degree: 88% by mol; manufactured by JAPAN VAM & POVAL CO., LTD.), and 3 parts by mass of surfactant (5% by mass) (Softazoline LSB-R; manufactured by Kawaken Fine Chemicals Co., Ltd.) were added in this order at 37° C. Then, the resulting solution was finished to 1000 parts by mass with pure water to prepare a low refractive index layer application liquid L1.

[2. Preparation of Low Refractive Index Layer Application Liquid L2 for Intermediate Layer]

A low refractive index layer application liquid L2 was prepared in a similar manner to preparation of the low refractive index layer application liquid L1 except that the amount of colloidal silica was changed to 372 parts by mass.

[3. Preparation of Low Refractive Index Layer Application Liquid L3 for Uppermost Layer]

A low refractive index layer application liquid L3 was prepared in a similar manner to preparation of the low refractive index layer application liquid L1 except that the amount of colloidal silica was changed to 50 parts by mass and the amount of the surfactant was changed to 9 parts by mass.

[4. Preparation of High Refractive Index Layer Application Liquid H for Intermediate Layer]

To 0.5 parts by mass of 15.0% by mass titanium oxide sol (SRD-W, volume average particle diameter: 5 nm, rutile type titanium dioxide particles, manufactured by Sakai Chemical Industry Co., Ltd.), 2 parts by mass of pure water was added. Thereafter, the resulting mixture was heated to 90° C. Subsequently, 0.5 parts by mass of a silicic acid aqueous solution (obtained by diluting sodium silicate No. 4 (manufactured by Nippon Chemical Industrial Co., Ltd.) with pure water such that the $SiO_2$ concentration became 0.5% by mass) was gradually added thereto. Subsequently, the resulting mixture was heated in an autoclave at 175° C. for 18 hours, cooled, and then concentrated with an ultrafiltration membrane to obtain a titanium dioxide sol with $SiO_2$ having a solid content concentration of 6% by mass attached to a surface thereof (hereinafter, referred to as silica-attached titanium dioxide sol) (volume average particle diameter: 9 nm).

To 113 parts by mass of the silica-attached titanium dioxide sol (20% by mass) thus obtained, 48 parts by mass of a citric acid aqueous solution (1.92% by mass) was added. Furthermore, 94 parts by mass of ethylene-modified polyvinyl alcohol (Exceval RS-2117 manufactured by Kuraray Co., Ltd., saponification degree: 97.5 to 99% by mol, ethylene modification degree: 3.0% by mol, polymerization degree: 1700, viscosity (4%, 20° C.): 23.0 to 30.0 (mPa·s), 8% by mass) was added thereto, and the resulting mixture was stirred. Finally, 0.4 parts by mass of a 5% by mass surfactant aqueous solution (Softazoline LSB-R manufactured by Kawaken Fine Chemicals Co., Ltd.) was added thereto, and the resulting mixture was finished to 1000 parts by mass with pure water to manufacture a high refractive index layer application liquid H.

[5. Manufacture of Optical Reflection Film]

While the low refractive index layer application liquids L1, L2, and L3 and the high refractive index layer application liquid H prepared in advance were kept warm at 45° C. using a slide hopper application device, 21 layer simultaneous multilayer application (total film thickness of heat ray reflective layer: 1.5 μm) was performed on a resin film (polyethylene terephthalate film having a thickness of 50 μm; Cosmoshine A4300 manufactured by Toyobo Co., Ltd.). Immediately thereafter, cold air was blown for one minute under a condition that a film surface had a temperature of 15° C. or less to perform setting, and then warm air of 80° C. was blown for drying. At this time, the low refractive index layer application liquid L1 for a lowermost layer was used for formation of the lowermost layer C. The low refractive index layer application liquid L2 and the high refractive index layer application liquid H for an intermediate layer were used alternately for formation of the intermediate layers B. The low refractive index layer application liquid L3 for an uppermost layer was used for formation of the uppermost layer A.

Application was performed such that, as the dry film thickness of each layer, each of the film thickness [ta] of the uppermost layer A and the film thickness [tc] of the lowermost layer C was 280 nm, the film thickness of the high refractive index layer 5H as one of the intermediate layers B was 130 nm, the film thickness of the low refractive index layer 5L as one of the intermediate layers B was 150 nm, and the average film thickness [tb] of the intermediate layers B was about 140 nm.

The optical reflection film 1 of Example 1 manufactured as described above has the optical interference film 5 formed by alternately laminating the high refractive index layer 5H containing titanium oxide particles as the first inorganic oxide particles and the low refractive index layer 5L containing silica (silicon dioxide) as second inorganic oxide particles on the substrate 3 formed of polyethylene terephthalate. The uppermost layer A and the lowermost layer C in the optical interference film 5 are the low refractive index layers 5L.

As illustrated in the Table 1 of FIG. 3, the optical reflection film 1 of Example 1 thus manufactured had, as a particle ratio in each layer constituting the optical interference film 5, 15% by volume for the low refractive index layer 5L of the uppermost layer A, 52% by volume for the low refractive index layer 5L of the lowermost layer C, 50% by volume for each of the low refractive index layers 5L constituting the intermediate layers B, and 45% by volume for each of the high refractive index layers 5H. Note that the particle ratio is a ratio of the first inorganic oxide particles or the second inorganic oxide particles with respect to the total amount of each layer.

In the optical reflection film 1 of Example 1, the film thickness [ta] of the uppermost layer A and the film thickness [tc] of the lowermost layer C with respect to the average film thickness [tb] of the intermediate layers B satisfy [ta/tb]=2 and [tc/tb]=2. Note that the Table 1 also illustrates the particle ratios and film thickness ratios of layers in the optical reflection films 1 of Examples 2 to 23 and Comparative Examples 1 to 5.

The Table 1 also illustrates the elastic modulus measured for each layer in the optical reflection film 1. Here, a sample in which a monolayer to be measured for elastic modulus (high refractive index layer 5H or low refractive index layer 5L) was disposed on a mirror-polished stainless-steel substrate was manufactured. Using Tribo Scope manufactured by Hysitron, Inc. and Nano Navi II manufactured by Hitachi High-Technologies Corporation in combination as a measuring device, the elastic modulus was measured at a maximum load of 50 μN by a nano-indentation method using a Cube Corner indenter as an indenter. Note that the elastic moduli of the high refractive index layer 5H and the low refractive index layer 5L constituting the intermediate layers B were measured for the intermediate layers B, and Table 1 illustrates an average elastic modulus [Eb] thereof.

Examples 2 to 5

Among the manufacturing procedures of Example 1, in the above [3. Preparation of low refractive index layer application liquid L3 for uppermost layer], the particle ratio of the low refractive index layer 5L constituting the uppermost layer A was changed by adjusting the amount of colloidal silica to manufacture an optical reflection film 1. As a result, the particle ratio of the low refractive index layer 5L constituting the uppermost layer A was set to 26% by volume in Example 2, 30% by volume in Example 3, 35% by volume in Example 4, and 40% by volume in Example 5. As a result, as described below, the elastic modulus of the uppermost layer A in each of Examples 2 to 5 was adjusted.

Example 6

Among the manufacturing procedures of Example 4, in the above [5. Manufacture of optical reflection film], by adjusting a supply flow rate of the low refractive index layer application liquid L1 for a lowermost layer by a slide hopper application device, the film thickness [tc] of the lowermost layer C was set to 140 nm, and the film thickness [tc] of the lowermost layer C with respect to the average film thickness [tb] of the intermediate layers B was changed to [tc/tb]=1 to manufacture the optical reflection film 1.

Examples 7 to 10

Among the manufacturing procedures of Example 4, in the above [5. Manufacture of optical reflection film], by adjusting a supply flow rate of the low refractive index layer application liquid L3 for an uppermost layer by a slide hopper application device, the film thickness [ta] of the uppermost layer A was changed to each value to manufacture an optical reflection film 1. As a result, the film thickness [ta] of the uppermost layer A with respect to the average film thickness [tb] of the intermediate layers B satisfied [ta/tb]=1.2 in Example 7, [ta/tb]=3 in Example 8, [ta/tb]=5 in Example 9, and [ta/tb]=7 in Example 10.

Examples 11 to 13

Among the manufacturing procedures of Example 4, in the above [1. Preparation of low refractive index layer application liquid L1 for lowermost layer], the particle ratio of the low refractive index layer 5L constituting the lowermost layer C was changed by adjusting the amount of colloidal silica to manufacture the optical reflection film 1. As a result, the particle ratio of the low refractive index layer 5L constituting the lowermost layer C was set to 41% by volume in Example 11, 37% by volume in Example 12, and 35% by volume in Example 13. As a result, as described below, the elastic modulus of the lowermost layer C in each of Examples 11 to 13 was adjusted.

Examples 14 to 16

Among the manufacturing procedures of Example 11, in the above [5. Manufacture of optical reflection film], by adjusting a supply flow rate of the low refractive index layer application liquid L1 for a lowermost layer by a slide hopper application device, the film thickness [tc] of the lowermost layer C was changed to each value to manufacture the optical reflection film 1. As a result, the film thickness [tc] of the lowermost layer C with respect to the average film thickness [tb] of the intermediate layers B was set to [tc/tb]=3 in Example 14, [tc/tb]=5 in Example 15, and [tc/tb]=7 in [Example 16].

Example 17

Among the manufacturing procedures of Example 12, in the above [5. Manufacture of optical reflection film], by adjusting a supply flow rate of the low refractive index layer application liquid L1 for a lowermost layer by a slide hopper application device, the film thickness [tc] of the lowermost layer C was changed, and by adjusting wire bar application of the low refractive index layer application liquid L3 for an uppermost layer, the film thickness [ta] of the uppermost layer A was changed to manufacture the optical reflection film 1. As a result, the film thickness [ta] of the uppermost layer A and the film thickness [tc] of the lowermost layer C with respect to the average film thickness [tb] of the intermediate layer B were set to [ta/tb]=3 and [tc/tb]=4, respectively.

Examples 18 to 20

Among the manufacturing procedures of Example 17, in the above [3. Preparation of low refractive index layer application liquid L3 for uppermost layer], by performing the following additional procedures, the uppermost layer A contained an emulsion resin to manufacture the optical reflection film 1.

That is, the above [3. Preparation of low refractive index layer application liquid L3 for uppermost layer] was changed as follows. 206 parts by mass of colloidal silica (10% by mass) (Snowtex OXS, average particle diameter of primary particles=4 to 6 nm; manufactured by Nissan Chemical Industries, Ltd.), 50 parts by mass of a boric acid aqueous solution (3% by mass), 534 parts by mass of polyvinyl alcohol (4% by mass) (JP-45; polymerization degree: 4500, saponification degree: 88% by mol; manufactured by JAPAN VAM & POVAL CO., LTD.), and 9 parts by mass of surfactant (5% by mass) (Softazoline LSB-R; manufactured by Kawaken Fine Chemicals Co., Ltd.) were added, and the resulting mixture was finished to 1000 parts by mass with pure water to manufacture the low refractive index layer application liquid L3.

At this time, by adding an anionic emulsion (AE-120A, water dispersion acrylic resin, particle diameter=55 nm, manufactured by ETEC CORPORATION, 37.0% by mass), the low refractive index layer application liquids L3 of Examples 18 to 20 were prepared. By changing the concentration of the emulsion solution, the ratio of the emulsion resin to the total amount of the binder and the emulsion resin was set to each value. The ratio of the emulsion resin to the binder was set to 7% by mass in Example 18, 15% by mass in Example 19, and 45% by mass in Example 20.

Example 21

Among the manufacturing procedures of Example 19, in the above [1. Preparation of low refractive index layer application liquid L1 for lowermost layer], by adding an anionic emulsion similar to the anionic emulsions described in Examples 18 to 20, the lowermost layer C contained an emulsion resin to manufacture the optical reflection film 1. The ratio of the emulsion resin to the binder was set to 15% by mass.

Examples 22 and 23

Among the manufacturing procedures of Example 21, anionic emulsions used in the above [1. Preparation of low refractive index layer application liquid L1 for lowermost layer] and [3. Preparation of low refractive index layer application liquid L3 for uppermost layer] were changed. As a result, the average particle diameter of the emulsion resin was changed to manufacture the optical reflection film 1. In Example 22, the average particle diameter of the emulsion resin was set to 80 nm by using Saibinol EC-657B (manufactured by Saiden Chemical Co., Ltd.) as the anionic emulsion. In Example 23, the average particle diameter of the emulsion resin was set to 100 nm by using Adeka Bontiter HUX-830 (manufactured by ADEKA Corporation) as the anionic emulsion.

Comparative Example 1

Among the manufacturing procedures of Example 1, in the above [1. Preparation of low refractive index layer application liquid L1 for lowermost layer] and [3. Preparation of low refractive index layer application liquid L3 for uppermost layer], the particle ratio of the low refractive index layer 5L constituting each of the uppermost layer A and the lowermost layer C was changed by adjusting the amount of colloidal silica. As a result, the particle ratio of the uppermost layer A was set to 55% by volume, and the particle ratio of the lowermost layer C was set to 40% by volume.

In the above [5. Manufacture of optical reflection film], by adjusting a supply flow rate of each of the low refractive index layer application liquid L1 for a lowermost layer and the low refractive index layer application liquid L3 for an uppermost layer by a slide hopper application device, the film thickness [tc] of the lowermost layer C and the film thickness [ta] of the uppermost layer A were changed. As a result, the film thickness [ta] of the uppermost layer and the film thickness [tc] of the lowermost layer with respect to the average film thickness [tb] of the intermediate layers were set to [ta/tb]=1 and [tc/tb]=4, respectively.

Comparative Example 2

Among the manufacturing procedures of Comparative Example 1, in the above [1. Preparation of low refractive index layer application liquid L1 for lowermost layer], by performing additional procedures similar to those described in Examples 18 to 20, the lowermost layer C contained an emulsion resin to manufacture an optical reflection film 1. The ratio of the emulsion resin to the binder was set to 15% by mass.

Comparative Examples 3 to 5

Among the manufacturing procedures of Comparative Example 1, in the above [1. Preparation of low refractive index layer application liquid L1 for lowermost layer] and [3. Preparation of low refractive index layer application liquid L3 for uppermost layer], the particle ratio of the low refractive index layer 5L constituting each of the uppermost layer A and the lowermost layer C was changed by adjusting the amount of colloidal silica. As a result, the particle ratio of the uppermost layer A was set to 42% by volume in Comparative Examples 3 and 4, and 35% by volume in Comparative Example 5. The particle ratio of the lowermost layer C was set to 55% by volume in Comparative Examples 3 and 4, and 35% by volume in Comparative Example 5.

In the above [5. Manufacture of optical reflection film], by adjusting a supply flow rate of each of the low refractive index layer application liquid L1 for a lowermost layer and the low refractive index layer application liquid L3 for an uppermost layer by a slide hopper application device, the film thickness [tc] of the lowermost layer C and the film thickness [ta] of the uppermost layer A were changed. As a result, the film thickness [ta] of the uppermost layer A and the film thickness [tc] of the lowermost layer C with respect to the average film thickness [tb] of the intermediate layers B were set to [ta/tb]=0.8 and [tc/tb]=1, respectively, in Comparative Example 3. [ta/tb]=1 and [tc/tb]=1 were satisfied in Comparative Example 4. [ta/tb]=10 and [tc/tb]=2 were satisfied in Comparative Example 5.

<Evaluation of Optical Reflection Film>

For each of the optical reflection films 1 of Examples 1 to 23 and Comparative Examples 1 to 5 manufactured as described above, the following performance evaluation was performed.

[Measurement of Refractive Index of Each Layer and Calculation of Refractive Index Difference (Initial Evaluation)]

A sample in which a monolayer to be measured for refractive index (high refractive index layer 5H or low refractive index layer 5L) was disposed on a substrate (PET film) was manufactured. The refractive index thereof was determined according to the following method.

As a spectrophotometer, U-4000 type (manufactured by Hitachi, Ltd.) was used.

A back surface of each sample on a measurement side was roughened. Thereafter, a light absorption treatment was performed with a black spray to prevent reflection of light on the back surface, and the refractive index was determined from the measurement result of reflectance in a visible light region (400 nm to 700 nm) under a condition of 5-degree specular reflection. Then, a refractive index difference was calculated from the obtained refractive indices. As a result, the refractive index difference between the high refractive index layer 5H and the low refractive index layer 5L including the uppermost layer A and the lowermost layer C, formed in each of Examples 1 to 23 and Comparative Examples 1 to 5, was 0.4.

[Measurement and Evaluation of Visible Light Transmittance and Infrared Transmittance]

Using a spectrophotometer (using an integrating sphere, U-4000 type manufactured by Hitachi, Ltd.), the transmittance of each optical reflection film in a region of 300 nm to 2000 nm was measured. As a result, in all the optical reflection films, the visible light transmittance at 550 nm was 75% or more, and the infrared transmittance at 1200 nm was 25% or less. It was confirmed that the optical reflection films manufactured here had a sufficient infrared shielding property.

[Measurement of Elastic Modulus of Each Layer and Calculation of Elastic Modulus Difference]

From the elastic moduli measured for layers constituting each optical reflection film, an elastic modulus difference [Eb−Ea] between the average elastic modulus [Eb] of the elastic moduli of the high refractive index layer 5H and the low refractive index layer 5L constituting the intermediate layers B and the elastic modulus [Ea] of the uppermost layer A, and an elastic modulus difference [Eb−Ec] between the average elastic modulus [Eb] and the elastic modulus [Ec] of the lowermost layer C were calculated. The Table 2 of FIG. 4 illustrates results thereof. Note that the Table 2 also illustrates a part of the configuration of each of the optical reflection films 1.

[Evaluation of Rainbow Unevenness (Initial Evaluation)]

The manufactured optical reflection film was cut into a size of 210 mm×297 mm. The cut optical reflection film was visually observed, and presence or absence of rainbow unevenness was evaluated according to the following criteria. The Table 2 illustrates evaluation results. Note that A to C are practically usable levels.

A: Unevenness is hardly recognized.
B: Unevenness is slightly recognized.
C: Unevenness is observed, and a small amount of loss is generated.
D: Unevenness is wholly observed and practically unusable (NG).

[Measurement of Haze Value: Evaluation of Surface Uniformity (Initial Evaluation)]

A haze value was measured using a haze meter (NDH 2000 manufactured by Nippon Denshoku Industries Co., Ltd.). The Table 2 illustrates evaluation results.

[Weather Resistance Test]

The following pressure-sensitive adhesive layer forming application liquid was applied onto a silicone releasing surface of a separator manufactured by Nakamoto Packs Co., Ltd. (NS23MA) with a comma coater so as to have a dry film thickness of 10 μm and dried at 90° C. for one minute to form a pressure-sensitive adhesive layer. Each of the optical reflection films manufactured in the above Examples and Comparative Examples was bonded to this pressure-sensitive adhesive layer to form the pressure-sensitive adhesive layer on the optical reflection film.

—Preparation of Pressure-Sensitive Adhesive Layer Forming Application Liquid—

To Corponyl N-6941M (manufactured by Nippon Synthetic Chemical Industry Co., Ltd.) as a pressure-sensitive adhesive, 3% by mass of Coronate L-55E (manufactured by Nippon Polyurethane Industry Co., Ltd.) as a curing agent was added. Furthermore, 5% by mass of Tinuvin 477 (manufactured by BASF Japan Co., Ltd.) as an ultraviolet absorber was added thereto. The resulting solution was diluted with ethyl acetate as a solvent so as to have a solid content of 10% by mass to prepare a pressure-sensitive adhesive layer forming application liquid.

In this sample, under a circumstance of a temperature of 40° C. and a humidity of 50%, the optical reflection film was irradiated with light from a xenon light source (180 W/m²) for 300 hours using a xenon weather meter (manufactured by Suga Test Instruments Co., Ltd.; emitting light extremely close to sunlight). Meanwhile, by assuming that one cycle included light irradiation and rainfall conditions by surface spraying for 18 minutes and sunny conditions with only light irradiation for 22 minutes, 450 cycles of tests were performed in total.

[Measurement of Haze Value: Evaluation of Surface Uniformity (Evaluation of Weather Resistance)]

A haze value of each optical reflection film after the above weather resistance test was measured using a haze meter (NDH 2000, manufactured by Nippon Denshoku Industries Co., Ltd.). The Table 2 illustrates evaluation results.

[Evaluation of Cracking (Evaluation of Weather Resistance)]

The manufactured optical reflection film was visually observed, and cracking was evaluated according to the following criteria. The Table 2 illustrates evaluation results. Note that A to D are practically usable levels.

A: No crack is generated.
B: Less than 5 cracks of less than 1 mm are generated per 100 cm².
C: From 5 to 20 cracks of less than 1 mm are generated per 100 cm².
D: 20 or less cracks of 1 mm or more and less than 3 mm are generated per 100 cm².
E: A crack of 3 mm or more is generated per 100 cm² (NG).

Referring to (1) and (1') in Table 2, the infrared light shielding films of Examples 1 to 23 have the thickness [ta] of the uppermost layer A and the average film thickness [tb] of the intermediate layers B satisfy (1) [ta/tb]=1.2 to 7, and the average elastic modulus [Eb] of the intermediate layers B and the elastic modulus [Ea] of the uppermost layer A satisfy (1') [Eb−Ea]>2 Gpa.

In the optical reflection films of Examples 1 to 23, the evaluation results of rainbow unevenness are kept at practically usable levels A to C, the change amount (difference) of haze before and after the weather resistance test is also suppressed to 1.1 or less, and the evaluation results of cracking are also kept at practically usable levels A to D.

Meanwhile, the optical reflection films of Comparative Examples 1 to 5 not satisfying the above conditional ranges did not satisfy all the above evaluations. Particularly, in Comparative Example 5 in which the ratio [ta/tb] was larger than (1) [ta/tb]=1.2 to 7, evaluation of rainbow unevenness was level D, and there was a problem in quality.

Particularly referring to (2) and (2') in Table 2, in the infrared light shielding films of Examples 11, 14 to 16, and 18 to 23, the elastic modulus [Ec] of the lowermost layer C is higher than the elastic modulus [Ea] of the uppermost layer A, (2) [Ec−Ea]>0 Gpa is satisfied, and the average elastic modulus [Eb] of the intermediate layers B and the elastic modulus [Ec] of the lowermost layer C satisfy (2') [Eb−Ec]>2 Gpa. In the optical reflection films, it has been confirmed that a difference in haze value before and after the weather resistance test in the evaluation of cracking is suppressed to 1.0 or less, but in Comparative Examples 1 to 4 largely deviating from this condition, the difference in haze value is as large as 1.4 or more.

Further referring to (3) in Table 2, the optical reflection films of Examples 2 to 23 satisfy that (3) the elastic modulus [Ea] of the uppermost layer A is 8 GPa or more and 15 GPa or less. In the optical reflection films, it has been confirmed that the difference in haze value before and after the weather resistance test is suppressed to 0.9 or less, and weather resistance is improved.

Referring to (4) in Table 2, in the optical reflection films of Examples 1 to 5 and 7 to 23, the film thickness [tc] of the lowermost layer C and the average film thickness [tb] of the intermediate layers B satisfy (4) [tc/tb]=1.2 to 7. In the optical reflection films, the evaluation results of rainbow unevenness are kept at practically usable levels A to C, the change amount (difference) of haze before and after the weather resistance test is also suppressed to 1.1 or less, and the evaluation results of cracking are also kept at practically usable levels A to D.

Further referring to (5) and (5') in Table 2, each of the optical reflection films of Examples 18 to 23 contains an emulsion resin in one or both of the uppermost layer A and the lowermost layer C. The light shielding films had a good tendency because the difference in haze value was small, and the evaluation of cracking was at level A or B.

Incidentally, in Examples 1 to 5, only the particle ratio in the uppermost layer A was changed. In these Examples 1 to 5, as seen by comparing the particle ratio of the uppermost layer A with (3) the elastic modulus of the uppermost layer, it has been confirmed that the elastic modulus increases with an increase in the particle ratio and that an effect of suppressing occurrence of rainbow unevenness is high as long as the particle ratio is in a range of up to 40% by volume.

In Examples 18 to 20, only the ratio of the emulsion resin with respect to the total amount of the binder and the emulsion resin in the uppermost layer A is changed. In these Examples 18 to 20, as seen by comparing the ratio of the emulsion resin in the uppermost layer A with (3) the elastic modulus of the uppermost layer, it is found that the elastic modulus decreases with an increase in the ratio as long as the ratio is in a range of up to 45%. As a result, by controlling the ratio of the emulsion resin, it has been confirmed that quality can be improved by changing the elastic modulus of each layer constituting the optical reflection film while the particle ratio for obtaining desired optical characteristics is secured.

Particularly referring to (6) and (6') in Table 2, in the optical reflection films of Examples 18 to 21, (6) and (6') the average particle diameter of the emulsion particles is 60 nm or less, a difference in haze value is smaller than that in Examples 22 and 23 outside this range to be suppressed to a low value of 0.4 or less, and improvement of weather resistance is has been confirmed.

REFERENCE SIGNS LIST

1 Optical reflection film
Substrate
Optical interference film
5H High refractive index layer
5L Low refractive index layer
100 Optical reflector
101 Base
A Uppermost layer
B Intermediate layer
C Lowermost layer

The invention claimed is:

1. An optical reflection film comprising an optical interference film formed by alternately laminating a first refractive index layer and a second refractive index layer with a refractive index difference therebetween on a substrate, the first refractive index higher than the second refractive index, wherein
in the first refractive index layers and the second refractive index layers constituting the optical interference film, a layer disposed closest to the substrate is defined as a lowermost layer, a layer farthest from the substrate is defined as an uppermost layer, and each of layers disposed between the lowermost layer and the uppermost layer is defined as an intermediate layer,
an average elastic modulus of the intermediate layers measured by a nano-indentation method is higher than an elastic modulus of the uppermost layer by 2 GPa or more,
a film thickness of the uppermost layer is 1.2 to 7 times an average film thickness of the intermediate layer,
each of the first refractive index layer and the second refractive index layer contains inorganic oxide particles, and
at least one of the lowermost layer and the uppermost layer contains an emulsion resin.

2. The optical reflection film according to claim 1, wherein
the average elastic modulus of the intermediate layers measured by the nano-indentation method is larger than an elastic modulus of the lowermost layer by 2 GPa or more, and
the elastic modulus of the lowermost layer measured by the nano-indentation method is larger than the elastic modulus of the uppermost layer.

3. The optical reflection film according to claim 1, wherein
the elastic modulus of the uppermost layer measured by the nano-indentation method is 8 GPa or more and 15 GPa or less.

4. The optical reflection film according to claim 1, wherein
a film thickness of the lowermost layer is 1.2 to 7 times the average film thickness of the intermediate layers.

5. The optical reflection film according to claim 1, wherein
the emulsion resin has an average particle diameter of 60 nm or less.

6. An optical reflector comprising the optical reflection film according to claim 1, disposed on at least one surface of a base.

7. The optical reflection film according to claim 2, wherein
the elastic modulus of the uppermost layer measured by the nano-indentation method is 8 GPa or more and 15 GPa or less.

8. The optical reflection film according to claim 2, wherein
a film thickness of the lowermost layer is 1.2 to 7 times the average film thickness of the intermediate layers.

9. An optical reflector comprising the optical reflection film according to claim 2, disposed on at least one surface of a base.

10. The optical reflection film according to claim 3, wherein
a film thickness of the lowermost layer is 1.2 to 7 times the average film thickness of the intermediate layers.

11. An optical reflector comprising the optical reflection film according to claim 3, disposed on at least one surface of a base.

12. An optical reflector comprising the optical reflection film according to claim 4, disposed on at least one surface of a base.

13. An optical reflector comprising the optical reflection film according to claim 7, disposed on at least one surface of a base.

14. An optical reflector comprising the optical reflection film according to claim 5, disposed on at least one surface of a base.

* * * * *